US008755439B2

(12) United States Patent
Sugimoto et al.

(10) Patent No.: US 8,755,439 B2
(45) Date of Patent: *Jun. 17, 2014

(54) MOVING PICTURE DECODING APPARATUS

(75) Inventors: Takashi Sugimoto, Osaka (JP); Takeshi Tanaka, Osaka (JP); Hiroshi Ikeda, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 135 days.

This patent is subject to a terminal disclaimer.

(21) Appl. No.: 13/428,354

(22) Filed: Mar. 23, 2012

(65) Prior Publication Data
US 2012/0183072 A1 Jul. 19, 2012

Related U.S. Application Data

(62) Division of application No. 12/438,868, filed as application No. PCT/JP2007/075115 on Dec. 27, 2007, now Pat. No. 8,265,159.

(30) Foreign Application Priority Data

Dec. 27, 2006 (JP) .................................. 2006-351245

(51) Int. Cl.
*H04N 7/50* (2006.01)
*H04N 7/26* (2006.01)
(52) U.S. Cl.
CPC ............................... *H04N 19/00533* (2013.01)
USPC ..................................................... 375/240.16
(58) Field of Classification Search
USPC ............... 375/E7.211, E7.18, 240.25, E7.176, 375/E7.198, E7.25, 240.16, 240.24, 375/E7.027, E7.147, E7.149, E7.17; 348/620; 386/278
See application file for complete search history.

(56) References Cited

U.S. PATENT DOCUMENTS 5,974,184 A 10/1999 Eifrig et al.
5,991,445 A * 11/1999 Kato .............................. 382/232
(Continued)

FOREIGN PATENT DOCUMENTS

CN 1324155 11/2001
EP 0 868 085 9/1998
(Continued)

OTHER PUBLICATIONS

International Search Report issued Jan. 29, 2008 in the International Application No. PCT/JP2007/075115.
(Continued)

*Primary Examiner* — Ricky Ngo
*Assistant Examiner* — Phuongchau B Nguyen
(74) *Attorney, Agent, or Firm* — Wenderoth, Lind & Ponack, L.L.P.

(57) ABSTRACT

Provided is a moving picture decoding apparatus including: a picture memory that stores previously decoded picture data of a picture including macroblocks and macroblock information described on a macroblock basis, in association therebetween; an error judging unit that judges presence or absence of an error for a current picture to be decoded; a picture data replacing unit that replaces, when an error is present, picture data of the current picture to be decoded with that of a previously decoded picture in the picture memory; and a macroblock information replacing unit that replaces macroblock information in association with the current picture to be decoded including an error with macroblock information stored in association with the previously decoded picture, or a macroblock information storage unit that stores information that indicates presence of the error for the current picture to be decoded in association therewith.

16 Claims, 16 Drawing Sheets

(56) References Cited

U.S. PATENT DOCUMENTS

| | | | |
|---|---|---|---|
| 5,991,447 A | | 11/1999 | Eifrig et al. |
| 6,005,980 A | | 12/1999 | Eifrig et al. |
| 6,026,195 A | | 2/2000 | Eifrig et al. |
| 6,489,996 B1 * | | 12/2002 | Matsumura et al. ........ 348/416.1 |
| 6,704,363 B1 * | | 3/2004 | Kim ......................... 375/240.27 |
| RE38,563 E | | 8/2004 | Eifrig et al. |
| RE38,564 E | | 8/2004 | Eifrig et al. |
| 8,265,159 B2 * | | 9/2012 | Sugimoto et al. ........ 375/240.16 |
| 2003/0039312 A1 * | | 2/2003 | Horowitz et al. ........ 375/240.24 |
| 2004/0057523 A1 | | 3/2004 | Koto et al. |
| 2004/0071217 A1 * | | 4/2004 | Lin ........................ 375/240.25 |
| 2004/0136461 A1 * | | 7/2004 | Kondo et al. ............ 375/240.16 |
| 2004/0146109 A1 * | | 7/2004 | Kondo et al. ............ 375/240.16 |
| 2005/0105614 A1 * | | 5/2005 | Katsavounidis et al. 375/240.06 |
| 2005/0152452 A1 | | 7/2005 | Suzuki |
| 2006/0215761 A1 * | | 9/2006 | Shi et al. ................. 375/240.16 |
| 2006/0227878 A1 | | 10/2006 | Mori et al. |
| 2006/0269153 A1 * | | 11/2006 | Shi et al. ....................... 382/236 |
| 2007/0009037 A1 * | | 1/2007 | Yamaguchi et al. ..... 375/240.16 |
| 2007/0014359 A1 | | 1/2007 | Gomila et al. |
| 2007/0047660 A1 * | | 3/2007 | Mitani et al. ............. 375/240.25 |
| 2008/0063071 A1 | | 3/2008 | Suzuki |
| 2008/0063072 A1 | | 3/2008 | Suzuki |
| 2008/0069225 A1 | | 3/2008 | Suzuki |
| 2008/0075171 A1 * | | 3/2008 | Suzuki .................... 375/240.16 |

FOREIGN PATENT DOCUMENTS

| | | |
|---|---|---|
| EP | 1 671 427 | 6/2006 |
| JP | 3-46481 | 2/1991 |
| JP | 8-84334 | 3/1996 |
| JP | 9-51541 | 2/1997 |
| JP | 10-23435 | 1/1998 |
| JP | 11-75191 | 3/1999 |
| JP | 2000-236522 | 8/2000 |
| JP | 2001-359103 | 12/2001 |
| JP | 2006-295569 | 10/2006 |
| WO | 2004/008775 | 1/2004 |
| WO | 2005/046072 | 5/2005 |

OTHER PUBLICATIONS

Extended European Search Report (in English language) issued May 3, 2011 in corresponding European Patent Application No. 07860337.0.

Sullivan: "*Joint Model Reference Encoding Methods and Decoding Concealment Methods*", ITU Study Group 16—Video Coding Experts Group—ISO/IEC MPEG & ITU-T VCEG (ISO/IECJTC1/SC29/WG11 and ITU-T SG16 Q6), No. JVT-J049, Dec. 12, 2003.

Yao Wang et al., "*Error Control and Concealment for Video Communication: A Review*", Proceedings of the IEEE, New York, US., vol. 86, No. 5, May 1, 1998.

Sun H., et al., "Error concealment algorithms for robust decoding of MPEG compressed video", Signal Processing Image Communication, Elsevier Science Publishers, Amsterdam, NL, vol. 10, No. 4, Sep. 1, 1997, pp. 249-268.

\* cited by examiner

MOVING PICTURE DECODING APPARATUS

This application is a divisional of application Ser. No. 12/438,868, filed Feb. 25, 2009, now U.S. Pat. No. 8,265,159 which is the National Stage of International Application No. PCT/JP2007/075115, filed Dec. 27, 2007.

TECHNICAL FIELD

The present invention relates to an apparatus and a method for decoding a moving picture with reference to information, such as a motion vector of a previously decoded picture or a reference picture, in order to decode an inputted stream.

BACKGROUND ART

In decoding a moving picture, information is usually compressed by reducing redundancy of the moving picture in a spatial direction and a temporal direction. Inter picture prediction is a method used for reducing redundancy in a temporal direction. When a picture is coded using inter picture prediction, a forward picture or a backward picture of the picture in display order is referred to as a reference picture.

A motion amount from the reference picture is detected, and then the information is compressed by eliminating redundancy in a spatial direction using a difference value between a picture obtained by performing motion compensation and a current picture to be coded.

The H.264 standard, which was recently standardized, specifies that a moving picture is coded on a per-slice basis. A slice, which is smaller than a picture, is composed of a plurality of macroblocks. A picture is composed of one or more slices. A slice that that includes macroblocks for which intra picture prediction is performed using not any reference picture but only a current picture to be coded is called an I slice. A slice that includes a macroblock for which inter picture prediction is performed with reference to a previously decoded picture and a macroblock for which intra picture prediction is performed, is called a P slice. A slice that includes a macroblock for which inter picture prediction is performed with reference to two or less previously decoded pictures and a macroblock for which intra picture prediction is performed, is called a B slice.

A picture may be composed of slices of the types above. A picture that includes only I slices is called an I picture. A picture that includes only I slices and P slices is called a P picture. A picture that includes I slices, P slices, and B slices is called a B picture.

Hereinafter, pictures are used for making the present description clearly understandable, but the same holds true for slices.

In comparison with the MPEG-2 and the MPEG-4 standards, the H.264 standard imposes substantially relaxed constraints on reference pictures. A reference picture to be referred to for a macroblock that belongs to a P picture may be either forward picture or a backward picture in display order as long as the reference picture has been already decoded. Two or less pictures to be referred to for a macroblock that belongs to a B picture may be either forward picture or a backward picture in display order as long as the reference picture has been already decoded. These reference pictures may be of any type of pictures, an I picture, a P picture, and a B picture.

FIG. 1 is a schematic view illustrating relationships in prediction (reference relationships) among pictures in a conventional method mentioned above for coding a moving picture.

Each vertical line in FIG. 1 represents one picture. A letter lower right of each vertical line indicates the picture type (I, P, or B) of the picture. Each arrow in FIG. 1 indicates that a picture at the pointed end of the arrow is referred to as a reference picture when inter picture prediction and decoding is performed for a picture at the other end of the arrow.

For B pictures, not more than two pictures are referred to for each macroblock: a reference to one of the two pictures (L0) is called forward reference; and a reference to the other picture (L1) is called backward reference. For the forward reference, a forward picture in display order is not necessarily, but only preferentially referred to. For the backward reference, a backward picture in display order is not necessarily, but only preferentially referred to.

For P pictures, not more than one picture is referred to for each macroblock. This reference is necessarily forward reference L0. As in the case of the B pictures, the picture referred to is not necessarily a forward picture in display order. For example, a B picture B9, which is ninth from the most forward picture in FIG. 1, refers to the tenth picture, which is a P picture P10 that follows the B9 in display order, as a forward reference picture, and refers to the seventh picture, which a P picture P7 that precedes the B9 in display order, as a backward reference picture. In comparison with the MPEG-2 and the MPEG-4 standards, the H.264 standard imposes substantially relaxed constraints also on display order of pictures. The display order is determined regardless of order of decoding until a picture memory to store decoded pictures overflows.

FIG. 2 is a schematic view illustrating relationships between decoding order and display order of pictures in a method for coding moving pictures according to the H.264 standard.

The upper row represents pictures arranged in decoding order, and the lower row represents pictures arranged in display order. The arrows between the rows indicate the correspondence between the decoding order and the display order of the pictures. The display order is coded as an attribute of each picture. For example, a P picture P10 is displayed after a B picture B11 and a P picture P13 that are decoded after the P picture P10.

In addition, the H.264 standard allows selecting a direct mode as a coding mode in which a current macroblock to be coded does not have a motion vector for decoding a B picture. There are two kinds of direct mode: the temporal direct mode and the spatial direct mode. In temporal direct mode, a motion vector to be used for a current macroblocks to be coded is predicted and generated by executing a scaling process on the basis of inter-picture positional relationships in display order using a motion vector of another previously coded picture as a reference motion vector (see Patent Reference 1).

FIG. 3 is a schematic view illustrating a method for predicting and generating a motion vector in temporal direct mode.

Vertical lines represent pictures. Letters P and B of symbols upper light of these pictures indicate picture types of P picture and B picture, respectively. Numerals attached to these picture type symbols indicate numbers in decoding order of the pictures (these naming rules are applicable in the following description). The pictures P1, B3, B4, B5, and P2 have display time information T1, T2, T3, T4, and T5, respectively. Decoding a macroblock BL0 in the picture B5 in temporal direct mode is described below.

The picture P2 adjacent to the picture B5 in display time is a previously decoded picture (anchor picture) P2. A decoding process is performed using a motion vector MV1 of a macroblock (anchor macroblock) BL1 that is situated in the same position in the picture P2 as the macroblock BL0. The motion vector MV1 has been used for decoding the macroblock BL1 and refers to the picture P1. In this case, to decode the macroblock BL0, a motion vector MV_F is used with the picture P1, and a motion vector MV_B with the picture P2. Then, when the magnitude of the motion vector MV1 is MV, the magnitude of the motion vector MV_F, MVf, and the magnitude of the motion vector MV_B, MVb, are obtained using the following equations:

$$MVf=(T4-T1)/(T5-T1)\times MV;\text{ and}$$

$$MVb=(T5-T4)/(T5-T1)\times MV.$$

Motion compensation is thus performed for the macroblock BL0 on the basis of the reference pictures, the pictures P1 and P2, using the motion vectors MV_F and MV_B that are obtained by scaling the motion vector MV1.

The anchor macroblock BL1 does not have a motion vector when the anchor macroblock BL1 is an intra prediction macroblock. In this case, the motion vector MV1 is assumed to be zero. As a result, the pixel value of the macroblock BL0 is obtained as the mean value of pixel values in macroblocks that are situated in the same positions in the pictures P2 and B4.

In spatial direct mode, as in the case of the temporal direct mode, a current macroblock to be coded does not have a motion vector. Decoding is performed with reference to motion vectors of previously decoded macroblocks spatially adjacent to the macroblock currently being coded (see Patent Reference 2).

FIG. 4 is a schematic view illustrating a method for predicting and generating a motion vector in spatial direct mode.

Decoding a macroblock BL0 in the picture B5 in spatial direct mode is described below.

Macroblocks each including a pixel A, B, or C are situated adjacent to a current macroblock to be decoded, macroblock BL0, and each have motion vectors MVA1, MVB1, or MVC1. In this case, a motion vector that has referred to a previously decoded picture closest to the current picture among these motion vectors is selected as a candidate motion vector of a macroblock being coded. When three motion vectors are thus selected, the median value of these motion vectors is determined as a motion vector of the current macroblock to be coded. When two are selected, the mean value of them is calculated to obtain a motion vector of the current macroblock to be coded. FIG. 4 shows an example that a motion vector MVA1 and MVC1 are obtained with reference to a picture P2, and a motion vector MVB1 with reference to a picture P1.

Accordingly, the mean value of the motion vectors MVA1 and MVC1 referring to the picture P2, which is the previously decoded picture closest to the current picture to be decoded, is calculated to obtain a first motion vector of the current macroblock to be decoded, a motion vector MV_F. A second motion vector MV_B is obtained in the same manner.

In decoding a moving picture, there may be an error in a received compressed stream. When there is, the decoding may be stopped upon a detection of the error. However, this causes inconvenience of preventing a user from viewing the moving picture. Error concealment is then performed in order to minimize such an error while avoiding a stop of a decoding operation. Conventional error concealment is typically performed by substituting picture data of a picture adjacent to a current picture to be decoded having an error for picture data of the current picture to be decoded (see Patent Reference 3).

FIG. 5 is a schematic view illustrating a conventional method for error concealment. There are pictures P1, B1, B2, and P2. The P1 has been decoded normally, but an error is detected in the P2 and a decoding operation is stopped. In this case, according to Patent Reference 3, error concealment is performed by substituting the picture P1, which has been already decoded, for the pictures B1, B2, and P2. The substitutional picture may be referred to by other pictures and has been decoded last. This will show a user not B1, B2, or P2 but a picture temporally close to the picture having an error, so that the user will not perceive the error but view pictures as if the pictures had been smoothly decoded.

Patent Reference 1: Japanese Unexamined Patent Application Publication No. 11-75191
Patent Reference 2: International Application Publication WO 2004/008775
Patent Reference 3: Japanese Unexamined Patent Application Publication No. 10-23435

SUMMARY OF THE INVENTION

Problems that Invention is to Solve

As described above, a current macroblock to be decoded does not have a motion vector in some coding modes of the method for coding moving pictures. The temporal direct mode is one of such modes. In this mode, a motion vector of a current macroblock to be decoded is predicted and generated using a motion vector, a reference type, or display time information of a previously decoded picture.

Conventional error concealment is performed by selecting a previously decoded picture dependent on a type of a picture having an error and substituting the selected picture for the picture having the error. However, this substitution is not for motion vectors, reference types, or display time information, but only for picture data to be displayed.

Due to this, information of a motion vector to be used for predicting a motion vector of a current macroblock to be decoded is missed when a picture having an error is selected as an anchor picture in temporal direct mode. This may prevent a normal decoding operation and cause inconsistency in data to be used for decoding, resulting in, at worst, a stop of the decoding operation.

The present invention, conceived to address this problem, has an object of performing decoding steadily and continuously while performing error concealment even when a picture having an error is selected as an anchor picture.

Means to Solve the Problems

In order to address the problem with the conventional technique, a moving picture decoding apparatus according to the present invention which decodes an inputted coded moving picture stream with reference to previously decoded macroblock information that is information on a macroblock basis and includes at least motion vector information includes: a judging unit configured to judge whether or not an error is present in the coded moving picture stream; a decoding unit configured to decode a current picture to be decoded included in the coded moving picture stream, so as to generate picture data; and a storage unit configured to store macroblock information of the coded moving picture stream and the decoded picture data in association with each other, wherein the storage unit is configured to store, when the judging unit judges that the error is present, information indicating the presence of the error, in association with the macroblock information, and the decoding unit is configured to modify a decoding operation when the macroblock information is the macroblock information in which the error is present, in the case of decoding the coded moving picture stream in a decoding mode in which decoding is performed with reference to macroblock information of a previously decoded picture.

Furthermore, the moving picture decoding apparatus according to the present invention includes: a judging unit configured to judge whether or not an error is present in the stream; a storage unit configured to store (i) macroblock information that is on a macroblock basis and includes at least motion vector information of the stream and (ii) previously decoded picture data in association with each other; a picture replacing unit configured to replace picture data of a stream in which the judging unit has judged that the error is present, with previously decoded picture data stored in the storage unit; and a macroblock information replacing unit configured to replace macroblock information of a stream in which the judging unit has judged that the error is present, with macroblock information stored in the storage unit, wherein the storage unit is configured to store (i) the macroblock information with which the macroblock information replacing unit has replaced the macroblock information and (ii) the picture data with which the picture data replacing unit has replaced the picture data, in association between each other.

Effects of the Invention

A moving picture decoding apparatus according to the present invention has a macroblock information replacing unit that replaces macroblock information for which an error in a stream is judged to be present with macroblock information of a previously decoded picture, thereby achieving steady and continuous decoding even when an error is present and an anchor picture is a picture for which the error concealment is performed.

NUMERICAL REFERENCES

Figure 1:
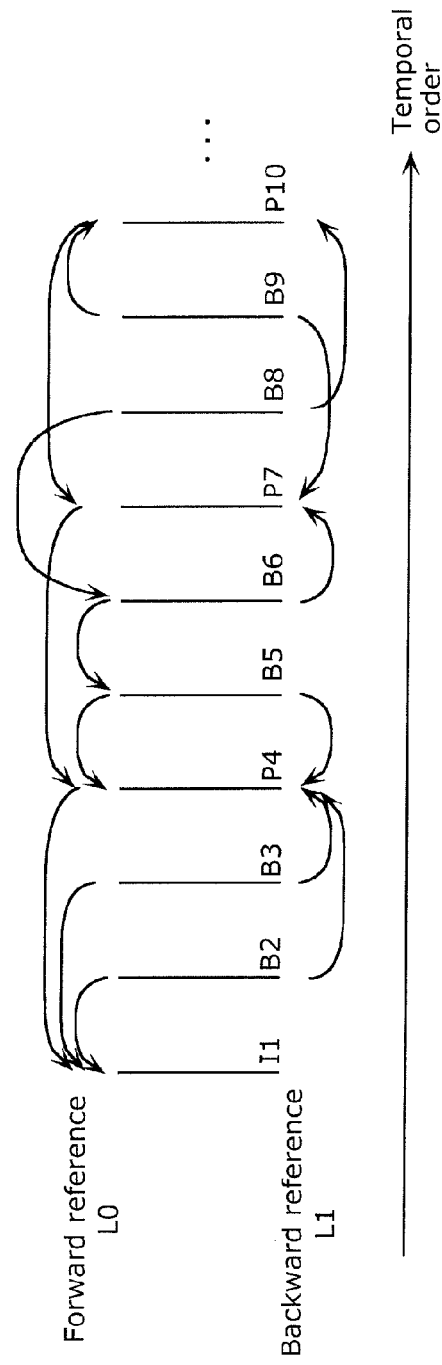
FIG. 1 illustrates relationships of reference pictures according to the H.264 standard.
Figure 2:
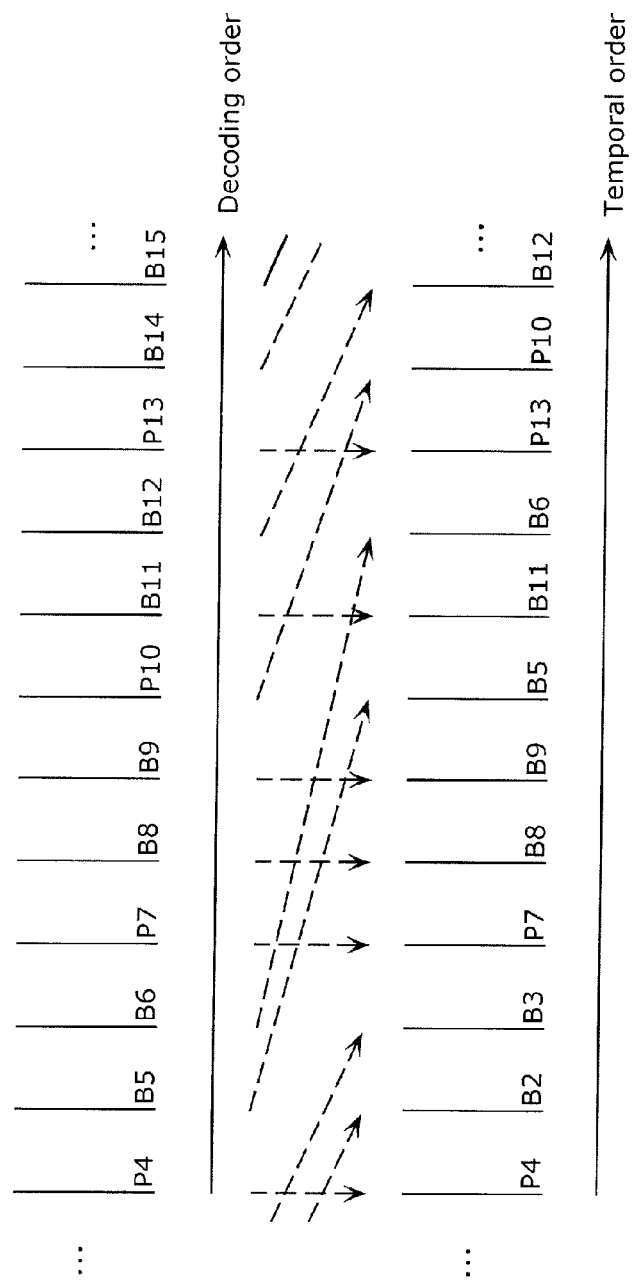
FIG. 2 illustrates relationships between decoding order and display order according to the H.264 standard.
Figure 3:
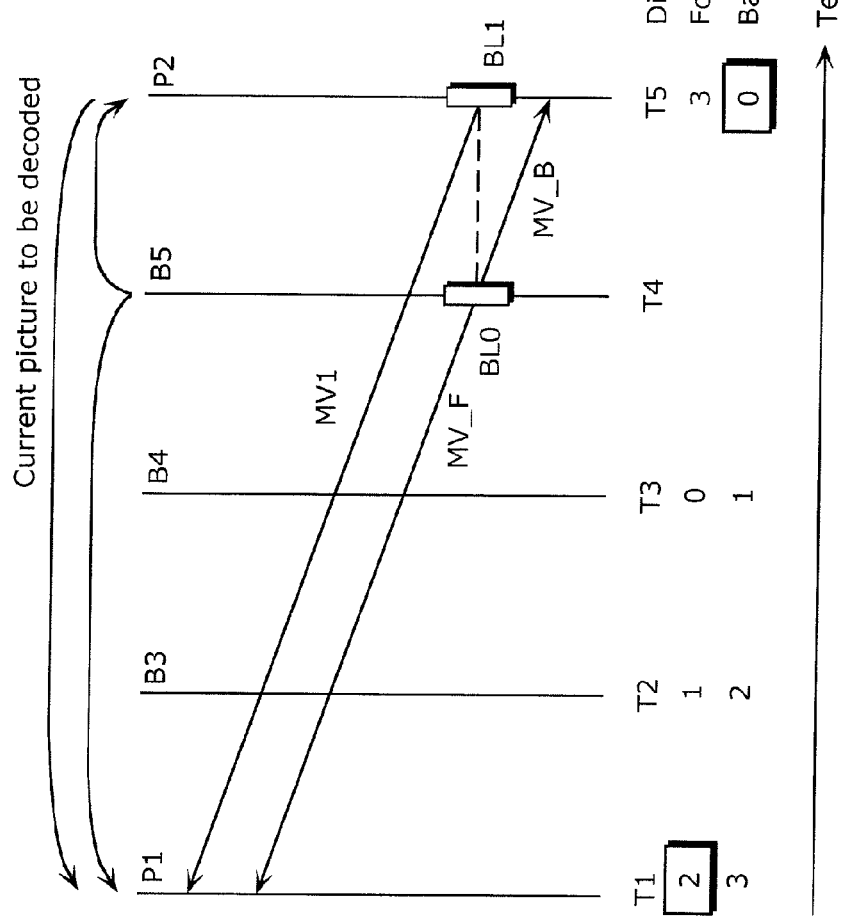
FIG. 3 illustrates a decoding process in temporal direct mode.
Figure 4:
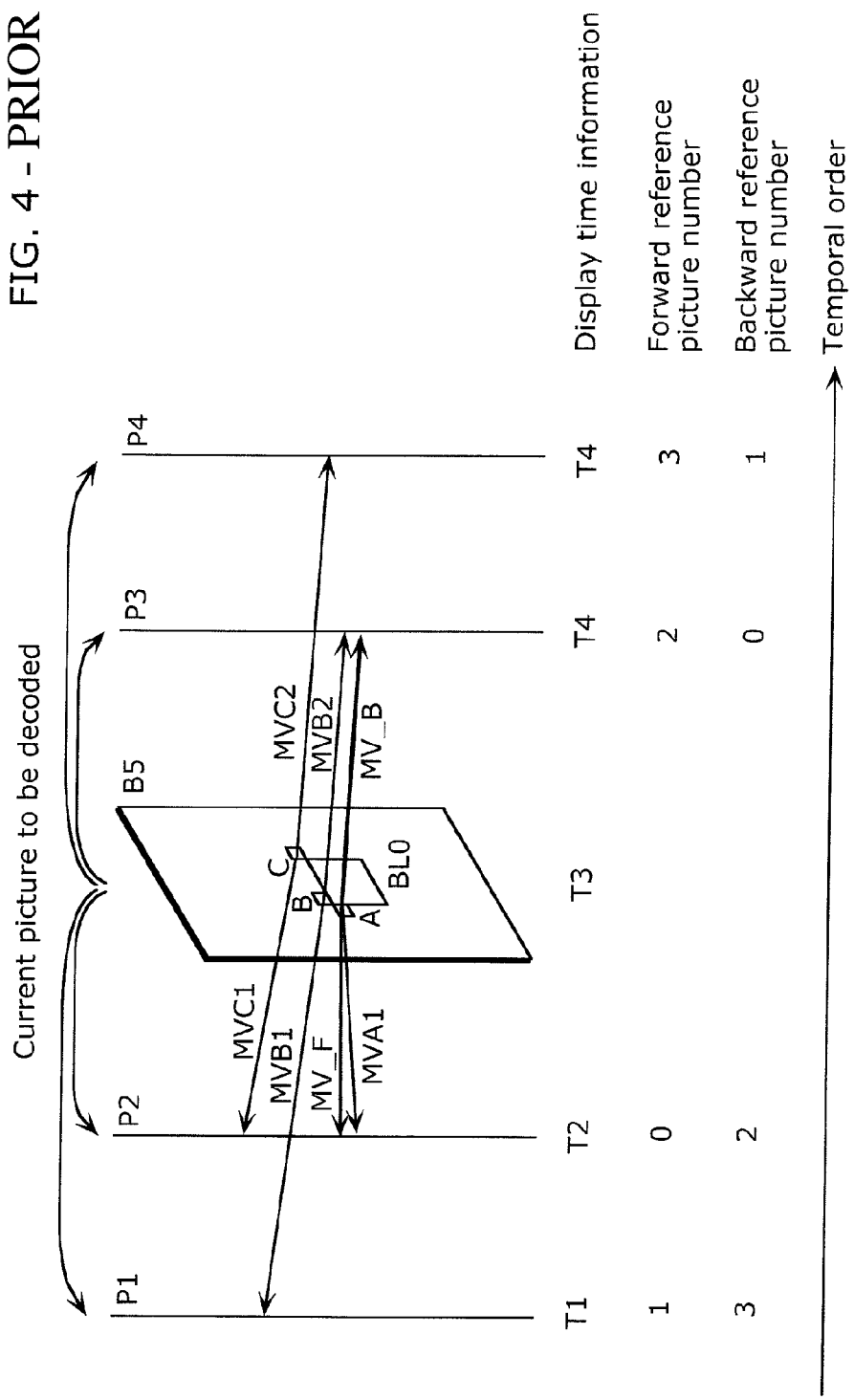
FIG. 4 illustrates a decoding process in spatial direct mode.
Figure 5:
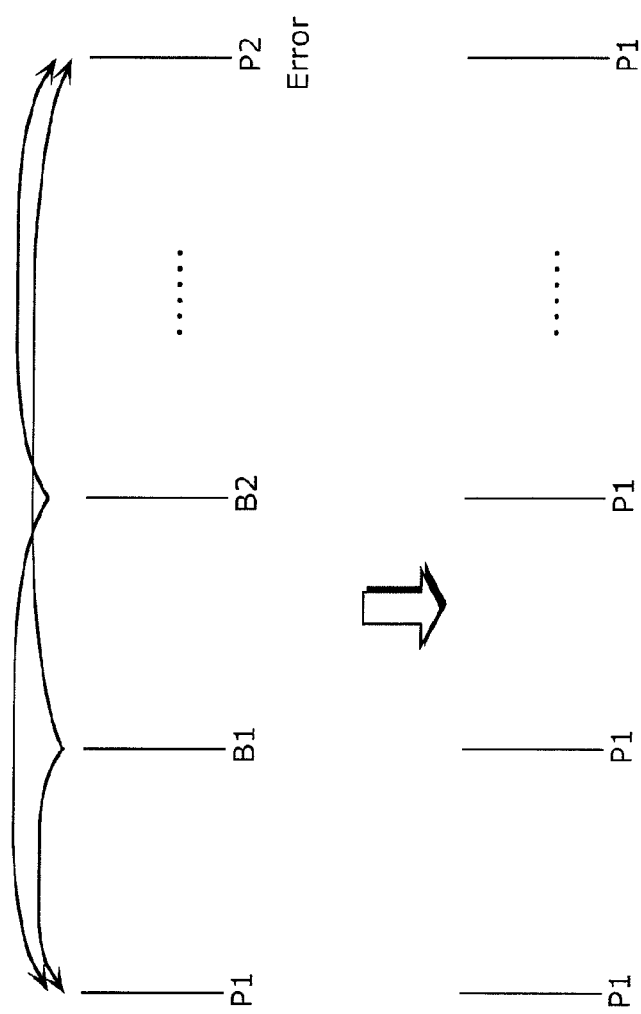
FIG. 5 illustrates a conventional method for error concealment.

101 Bitstream analysis unit
102 Prediction residual decoding unit
103 Picture memory
104 Error judging unit
105 Decoded picture data switching unit
106 Motion compensation unit
107 Adder
108 Macroblock type switching unit
109 Picture data replacing unit
110 Motion vector calculating unit
111 Macroblock information storage unit
112 Information switching unit
113 Macroblock information replacing unit
114 Storage unit
115 Display unit

DETAILED DESCRIPTION OF THE INVENTION

Hereinafter, a moving picture decoding apparatus according to the present invention is described with reference to figures.

First Embodiment

Figure 6:
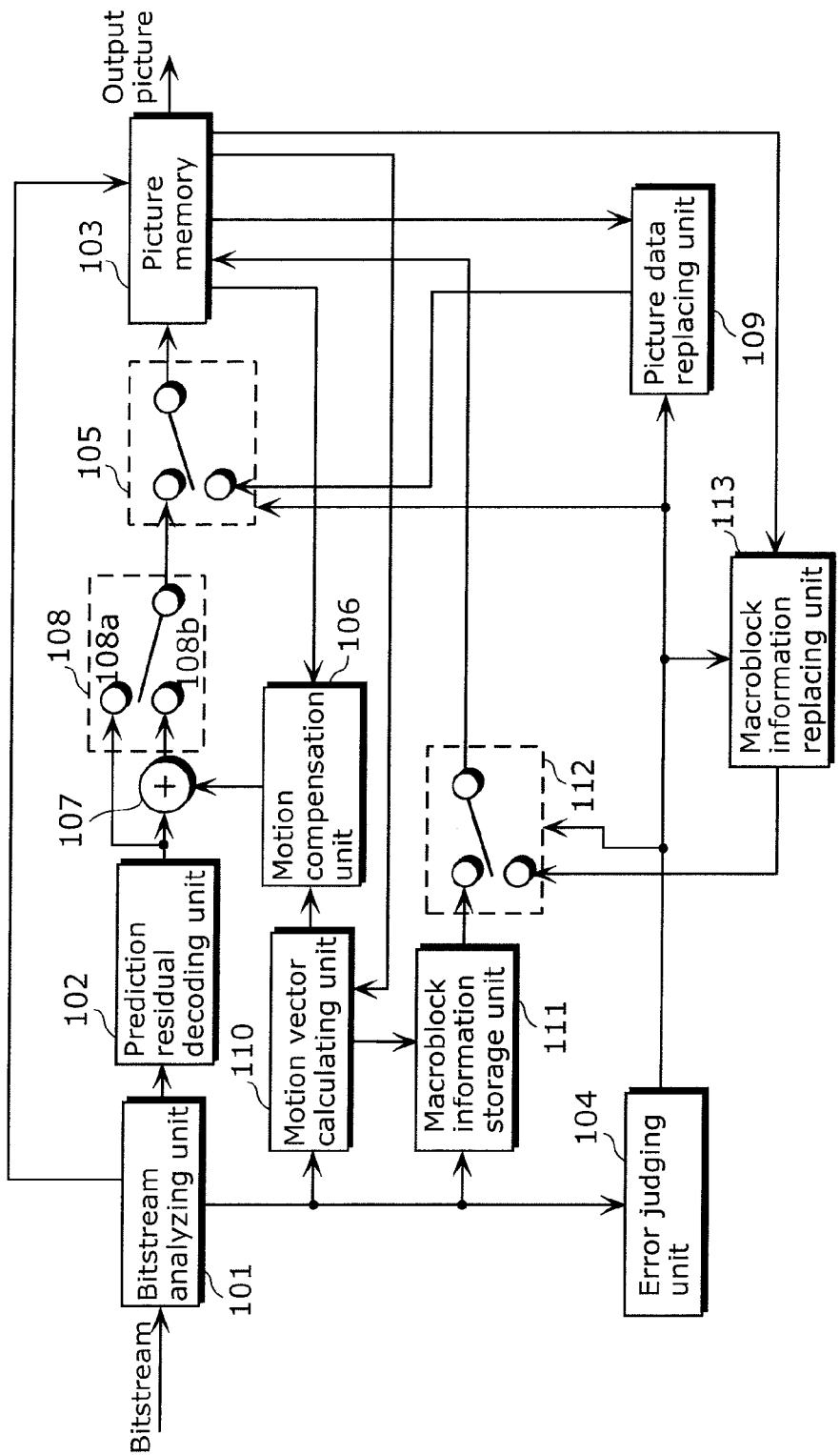
FIG. 6 is a block diagram showing an exemplary configuration of the moving picture decoding apparatus according to the first, second and third embodiments.

A configuration of a moving picture decoding apparatus according to the first embodiment is described using figures. FIG. 6 is a block diagram showing an example of configuration of the moving picture decoding apparatus according to the first embodiment.

When a picture in a received bitstream includes an error, the moving picture decoding apparatus according to the first embodiment shown in FIG. 6 replaces not only picture data of the picture with picture data of a previously decoded picture, but also macroblock information of each macroblock that includes a motion vector with macroblock information of the previously decoded picture, and picture management information, which is information on a picture basis, with picture management information of the previously decoded picture. The moving picture decoding apparatus includes a bitstream analysis unit 101, a prediction residual decoding unit 102, a picture memory 103, an error judging unit 104, a decoded picture data switching unit 105, a motion compensation unit 106, an adder 107, a macroblock type switching unit 108, a picture data replacing unit 109, a motion vector calculating unit 110, a macroblock information storage unit 111, an information switching unit 112, and a macroblock information replacing unit 113.

The bitstream analysis unit 101 extracts, from a received bitstream, data such as block type information, error information, reference picture information, motion vector information, display time information, prediction residual coded data, and then provides the picture memory 103 with these data.

The bitstream analysis unit 101 also provides the motion vector calculating unit 110 at least with the block type information, the motion vector information, and the reference picture information, the macroblock information storage unit 111 at least with the block type information, the motion vector information, the reference picture information, and display time information, the prediction residual decoding unit 102 with the prediction residual coded data. Furthermore, the bitstream analysis unit 101 detects whether or not an error is present in the bitstream.

The prediction residual decoding unit 102 performs inverse orthogonal transformation or inverse quantization for prediction residual coded data extracted by the bitstream analysis unit 101, generates prediction residual picture data, and then outputs the generated data to the adder 107. The prediction residual decoding unit 102, motion compensation unit 106, the adder 107, and the motion vector calculating unit 110 are an example of "a decoding unit configured to decode a current picture to be decoded included in the decoded moving picture stream".

The motion vector calculating unit 110 outputs the motion vector information received from the bitstream analysis unit 101 to the motion compensation unit 106 when judging, according to the block type information received from the bitstream analysis unit 101, that motion vector information is included in the bitstream.

When judging, according to the block type information, that the macroblock is predicted in direct mode where motion vector information is not included in the bitstream, the motion vector calculating unit 110 reads, from the picture memory 103, motion vector information and block type information of a macroblock situated in the same position in an anchor picture, and display time information of the anchor picture, so as to calculate a motion vector, and then outputs the calculated motion vector to the motion compensation unit 106 and the macroblock information storage unit 111.

The macroblock information storage unit 111 stores the variety of information received from the bitstream analysis unit 101 and the motion vector information received from the motion vector calculating unit 110 and outputs them to the information switching unit 112.

The error judging unit 104 judges whether or not that the bitstream analysis unit 101 has detected an error, and then informs the decoded picture data switching unit 105, the picture data replacing unit 109, the information switching unit 112, and the macroblock information replacing unit 113 about the judgment result. The bitstream analysis unit 101 and the error judging unit 104 are an example of "a judging unit configured to judge whether or not an error is present in a current picture to be decoded in the coded moving picture stream".

The motion compensation unit 106 reads, according to the motion vector information and the reference picture information received from the motion vector calculating unit 110, previously decoded picture data from the picture memory 103, to generate motion compensation picture data, and outputs the generated motion compensation picture data to the adder 107.

The adder 107 adds the prediction residual picture data received from the prediction residual decoding unit 102 and the motion compensation picture data received from the motion compensation unit 106 to generate decoded picture data. The adder 107 then outputs the decoded picture data to the macroblock type switching unit 108.

The macroblock type switching unit 108 switches its connection, according to the block type information, to 108b when using motion compensation, and to 108a when not using it. When the connection is switched to the 108b, the macroblock type switching unit 108 receives the picture data generated by the adder 107 as decoded picture data and outputs the decoded picture data to the decoded picture data switching unit 105. When the connection is switched to the 108a, the macroblock type switching unit 108 receives the picture data generated by the prediction residual decoding unit 102 and outputs the picture data, without modifying it, as decoded picture data to the decoded picture data switching unit 105.

The picture data replacing unit 109 receives the judgment result from the error judging unit 104. When the result shows that an error has been detected, the picture data replacing unit 109 reads previously decoded picture data from the picture memory 103 and outputs the decoded picture data to the decoded picture data switching unit 105. The picture data replacing unit 109 selects the last decoded picture.

The decoded picture data switching unit 105 is a switch or the like. It receives the judgment result from the error judging unit 104. When the result shows that no error has been detected, the decoded picture data switching unit 105 allows writing the data outputted from the macroblock type switching unit 108 in the picture memory 103. When the result shows that an error has been detected, the decoded picture data switching unit 105 allows writing the data outputted from the picture data replacing unit 109 in the picture memory 103. The picture data replacing unit 109 and the decoded picture data switching unit 105 are an example of "a picture data replacing unit configured to replace picture data of the current picture to be decoded with the previously decoded picture data stored by the storage unit prior to the current picture to be decoded, when said judging unit judges that the error is present".

The picture memory 103 stores the picture data received from the decoded picture data switching unit 105 and the variety of information extracted by the bitstream analysis unit 101, sorting them into picture management information, picture data, and macroblock information. The picture management information includes at least display time information, and the macroblock information includes at least a motion vector for the decoding. The picture management information and the macroblock information may include a common item of information. For example, both the picture management information and the macroblock information include display time information. The picture memory 103 is an example of "a storage unit configured to store (i) macroblock information that includes at least motion vector information and is described in the coded moving picture stream on a macroblock basis and (ii) previously decoded picture data of a picture that includes the macroblock, in association with each other" and "the storage unit is configured to store (i) the macroblock information with which the macroblock information replacing unit has replaced the macroblock information in association with the current picture to be decoded and (ii) the picture data with which the picture data replacing unit has replaced the picture data of the current picture to be decoded, in association between each other".

The information switching unit 112 is a switch or the like. It receives the judgment result from the error judging unit 104. When the result shows that no error has been detected, the information switching unit 112 allows writing the variety of information outputted from the macroblock information storage unit 111 in the picture memory 103. When the result shows that an error has been detected, the information switching unit 112 allows writing the macroblock information and the picture management information read by the macroblock information replacing unit 113 in the picture memory 103. The picture memory 103, the information switching unit 112, the macroblock information replacing unit 113, and the macroblock information storage unit 602 described below are an example of "a storage unit configured to replace, with macroblock information stored in association with the previously decoded picture, the macroblock information in association with the current picture to be decoded, when the judging unit judges that the error is present, or store the information that indicates the current picture to be decoded and macroblock information of the current picture to be decoded, in association with each other".

The macroblock information replacing unit 113 is an example of "a macroblock information replacing unit configured to replace, with macroblock information stored in association with the previously decoded picture, the macroblock information in association with the current picture to be decoded, when the judging unit judges that the error is present". The macroblock information replacing unit 113 receives the judgment result from the error judging unit 104. When the result shows that an error has been detected, the macroblock information replacing unit 113 reads macroblock information and picture management information of a previously decoded picture from the picture memory 103. The macroblock information replacing unit 113 then outputs the picture management information and the macroblock information read from the picture memory 103 to the information switching unit 112. The picture management information and the macroblock information of a previously decoded picture is a set of information that have been associated, using display time information, with picture data of a picture used by the picture data replacing unit 109. In other words, the picture management information and the macroblock information are in association with the last decoded picture data. Using display time information included in the picture management information associated with the last decoded picture may not achieve accurate scaling for an obtained motion vector. However, the difference between display times of a current picture to be decoded and the last decoded picture does not cause a critical problem when the obtained motion vector refers to a distant picture. Accordingly, a motion vector of the current picture to be decoded is approximately calculated in temporal direct mode.

Figure 7:
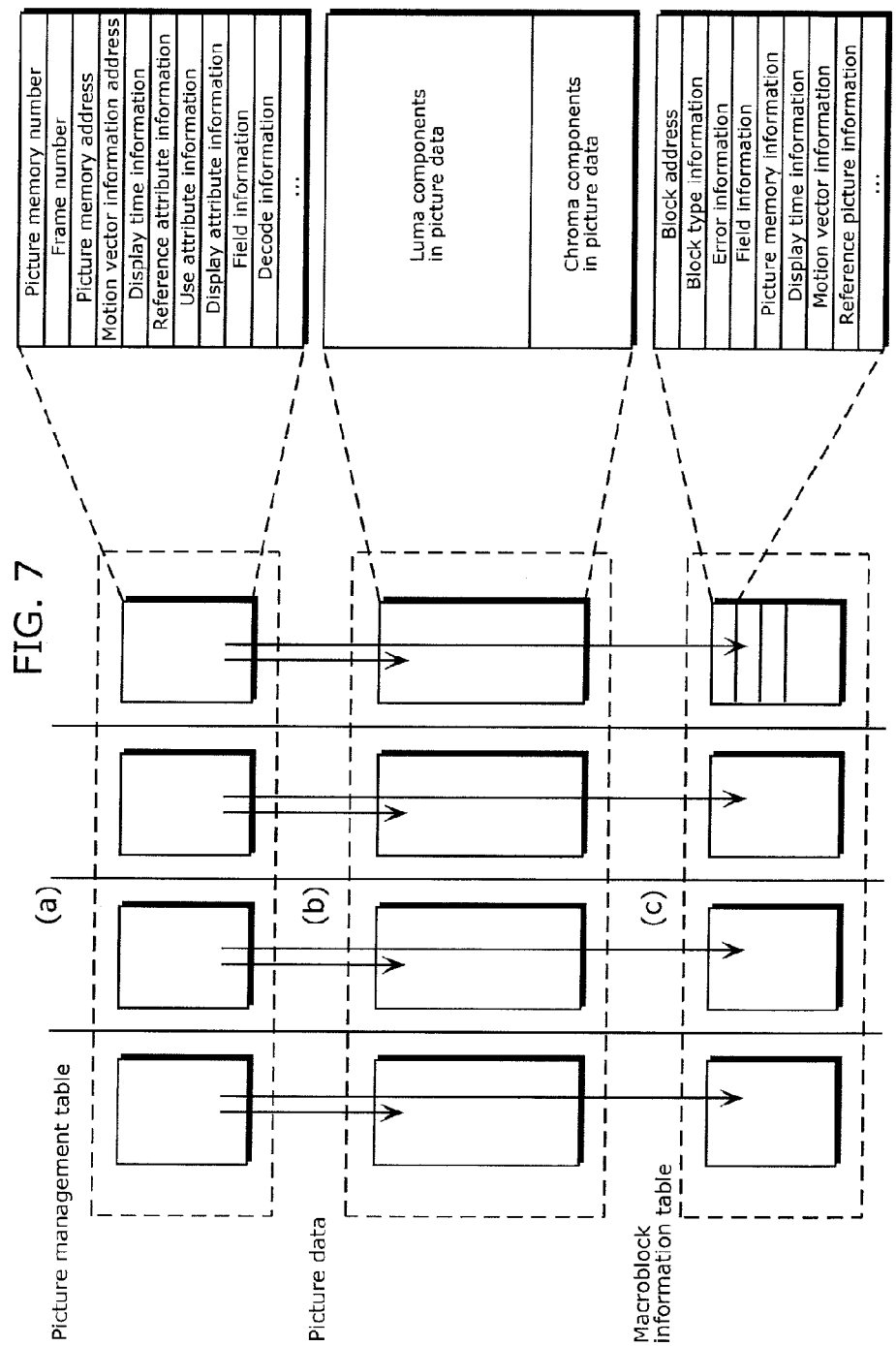
FIG. 7 including sections (a), (b), and (c) shows an example of contents of data to be stored in a picture memory where the data is associated with one another.

A data structure to be stored in the picture memory 103 of the moving picture decoding apparatus is described using FIG. 7. FIG. 7 shows an example of contents of data to be stored in the picture memory where the data is associated with one another.

Section (a) of FIG. 7 illustrates picture management information that is management information for each of the pictures stored in the picture memory 103. The picture management information includes at least display time information. Section (b) of FIG. 7 illustrates decoded picture data composed of luma components and chroma components. This data is to be reference picture data and output picture data. Section (c) of FIG. 7 illustrates macroblock information. The macroblock information includes at least block type information, motion vector information, and reference picture information and is necessary for decoding in direct mode. In usual decoding, items in the information shown in sections (a), (b), and (c) of FIG. 7 corresponds to each other and are managed collectively.

Figure 8:
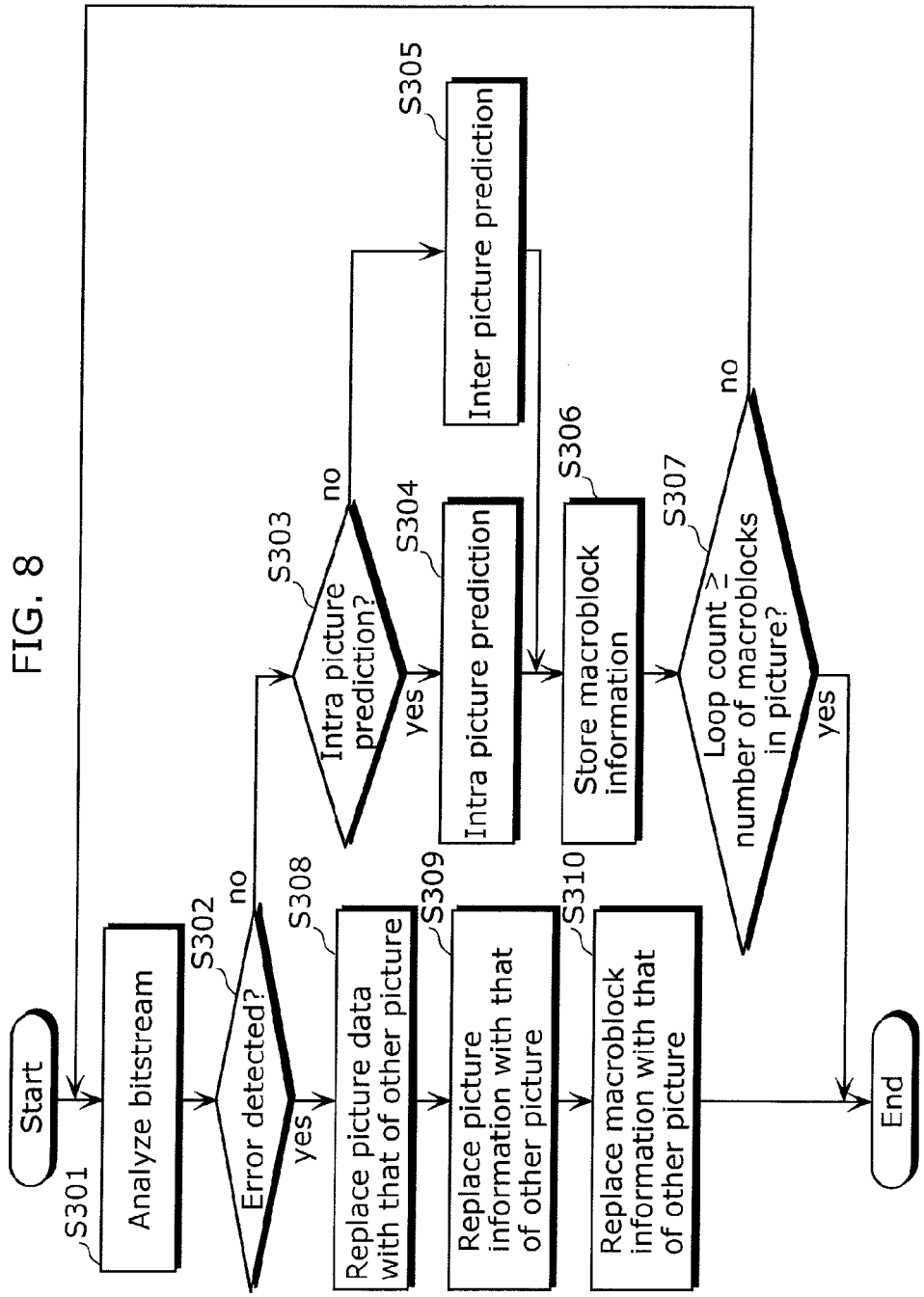
FIG. 8 is a flowchart showing an example of a decoding operation of the moving picture decoding apparatus according to the first embodiment.

An operation of the moving picture decoding apparatus according to the first embodiment is described using a flowchart shown in FIG. 8. FIG. 8 is a flowchart showing an example of a decoding operation of the moving picture decoding apparatus according to the first embodiment.

First, the bitstream analysis unit 101 obtains block type information, motion vector information, reference picture information, and the like of respective macroblocks from a received bitstream.

The error judging unit 104 judges whether or not that the bitstream analysis unit 101 has detected an error (S302).

When the error judging unit 104 in step S302 judges that no error has been detected, the macroblock type switching unit 108 switches picture prediction methods for each macroblock according to its block type (S303).

When a picture prediction method for a macroblock is switched to intra picture prediction, the prediction residual decoding unit 102 or an intra picture prediction unit, which is not shown in figures, generates decoded picture data and stores the data in the picture memory 103 (S304).

When a picture prediction method for a macroblock is switched to inter picture prediction, the motion compensation unit 106 generates motion compensation picture data using the reference picture information or the motion vector information. The adder 107 adds the motion compensation picture data and prediction residual picture data and generates decoded picture data. The generated decoded data is stored in the picture memory 103 (S305).

The macroblock information storage unit 111 stores, in the picture memory 103, macroblock information that includes at least the block type information and the motion vector information for the decoding (S306).

The steps above are repeated for all the macroblocks in a current picture to be decoded (S307).

When the error judging unit 104 in step S302 judges that an error has been detected, the picture data replacing unit 109 replaces whole picture data of the picture to be decoded with picture data of a previously decoded picture (S308).

The macroblock information replacing unit 113 replaces picture management information of the picture to be decoded with picture management information of the last decoded picture (S309).

Following this, the macroblock information replacing unit 113 replaces macroblock information of the whole picture to be decoded with macroblock information of the last decoded picture (S310). In other words, the moving picture decoding apparatus according to the first embodiment detects presence or absence of an error for each macroblock. When no error is detected in a whole picture, each macroblock is decoded as usual. When an error is detected in a current picture to be decoded, the moving picture decoding apparatus replaces whole picture data, macroblock information, and picture management information of the current picture to be decoded all together.

Although picture management information and macroblock information are replaced in the embodiment above, it is also practically possible that (i) a current picture to be decoded including an error duplicates picture data, macroblock information, and picture management information of the last decoded picture, or that (ii) addresses in the picture memory 103 where picture data, macroblock information, and picture management information of the last decoded picture are stored are used for representing the those data and information of the picture including an error. In other words, in the case of (i), a plurality of sets of picture data, macroblock information, and picture management information of the last decoded picture exist as actual data of a current picture to be decoded. In contrast, in the case of (ii), only one actual set of picture data, macroblock information, and picture management information of a last decoded picture exists. Instead, addresses of these data and information in the picture memory 103 are presented to indicate picture data, macroblock information, and picture management information of the picture including an error. Accordingly, replacement in the manner of (ii) has an advantageous effect of saving storage area in the picture memory 103.

This configuration allows using macroblock information of a properly decoded picture not only for picture data to be displayed but also for macroblock information necessary for decoding a backward picture of the properly decoded picture in direct mode, thereby enabling a steady and continuous decoding operation.

Although picture data and macroblock information of the last decoded picture are used as substitutes in the replacement in the first embodiment, it is also possible to use, as such substitutes, those of a picture to be displayed last or a picture closest to a current picture to be decoded in display order. Furthermore, it is possible to use picture data and macroblock information of a picture that is approximate to a picture to be displayed last or a picture closest to a current picture to be decoded in display order as substitutes in the replacement. A picture that is approximate to such pictures may be, for example, a picture to be displayed second last, or a picture second closest to a current picture to be decoded in display order. Picture data and macroblock information to be substitutes may be taken from a picture or a different picture. It is also possible to use some items of macroblock information of other pictures as substitutes and calculate other items.

Although concealment of picture data and macroblock information is performed on a picture-by-picture basis, it is also possible to be performed on a slice-by-slice or a macroblock-by-macroblock basis. Furthermore, for macroblocks in a picture, concealment may be performed for macroblocks from the first macroblock to a macroblock including an error, or for the macroblock including the error to the end macroblock.

For example, when concealment is performed on a macroblock-by-macroblock basis, picture data of a current picture to be decoded including an error is replaced by picture data of a macroblock decoded immediately before the current macroblock to be decoded or picture data of a macroblock to be decoded immediately after the current macroblock to be decoded. When an error is detected in macroblock information including motion vector information of a current picture to be decoded, the macroblock information of the current macroblock to be decoded is replaced by macroblock information of a macroblock decoded immediately before the current macroblock to be decoded or macroblock information of a macroblock to be decoded immediately after the current macroblock to be decoded. In this case, since concealment is performed on a macroblock-by-macroblock basis, picture management information of the current picture may be used as it is.

Furthermore, as in the case of the macroblock-by-macroblock basis, picture data of a current slice to be decoded including an error is replaced by picture data of a slice decoded immediately before the current slice to be decoded or picture data of a slice to be decoded immediately after the current slice to be decoded when concealment is performed on a slice-by-slice basis. When an error is detected in macroblock information including motion vector information of a current slice to be decoded, the macroblock information of all macroblocks included in the current slice to be decoded may be replaced by macroblock information of all macroblocks included in a slice decoded immediately before the current slice to be decoded or macroblock information of all macroblocks included in a slice to be decoded immediately after the current slice to be decoded. For picture management information, that of the current slice to be decoded may be used as it is. It is also possible to use picture management information of a picture decoded immediately before the current slice to be decoded or picture management information of a picture to be decoded immediately after the current slice to be decoded, dependent on the number of consecutive slices with errors.

Motion vector information and display time information of a picture decoded immediately before a current picture to be decoded are used as substitute of those of the current picture to be decoded as they are in the first embodiment, but the present invention is not limited to this. For example, it is also possible to calculate display time information of a frame having a replaced picture data from a frame rate and overwrite display time information included in substitutional macroblock information with the calculated display time information.

Second Embodiment

Since a configuration of a moving picture decoding apparatus according to the second embodiment is the same as shown in FIG. 6 which is used for describing the first embodiment, a description thereof is omitted.

The second embodiment differs from the first embodiment in the operation of the macroblock information replacing unit 113. In the second embodiment, the macroblock information replacing unit 113 is an example of "the macroblock information replacing unit configured to use not the display time information but display time information of the current picture to be decoded, when replacing picture management information of the moving picture stream in which the judging unit has judged that the error is present with picture management information stored in said storage unit". The macroblock information replacing unit 113 receives a judgment result from the error judging unit 104. When the result shows that an error has been detected, the macroblock information replacing unit 113 reads picture management information from the picture memory 103 and outputs the picture management information to the information switching unit 112 not as it is but as with display time information therein overwritten with display time information of a picture that includes the error. As in the case of the first embodiment, for all macroblocks in a picture, the macroblock information replacing unit 113 reads, from the picture memory 103, all macroblock information of the last decoded picture and outputs it.

The picture memory 103 is an example of "the storage unit configured to store, with an association with the picture data, picture management information that is described for respective pictures and includes at least display time information", and "store the picture management information after the replacing by the macroblock information replacing unit".

Figure 9:
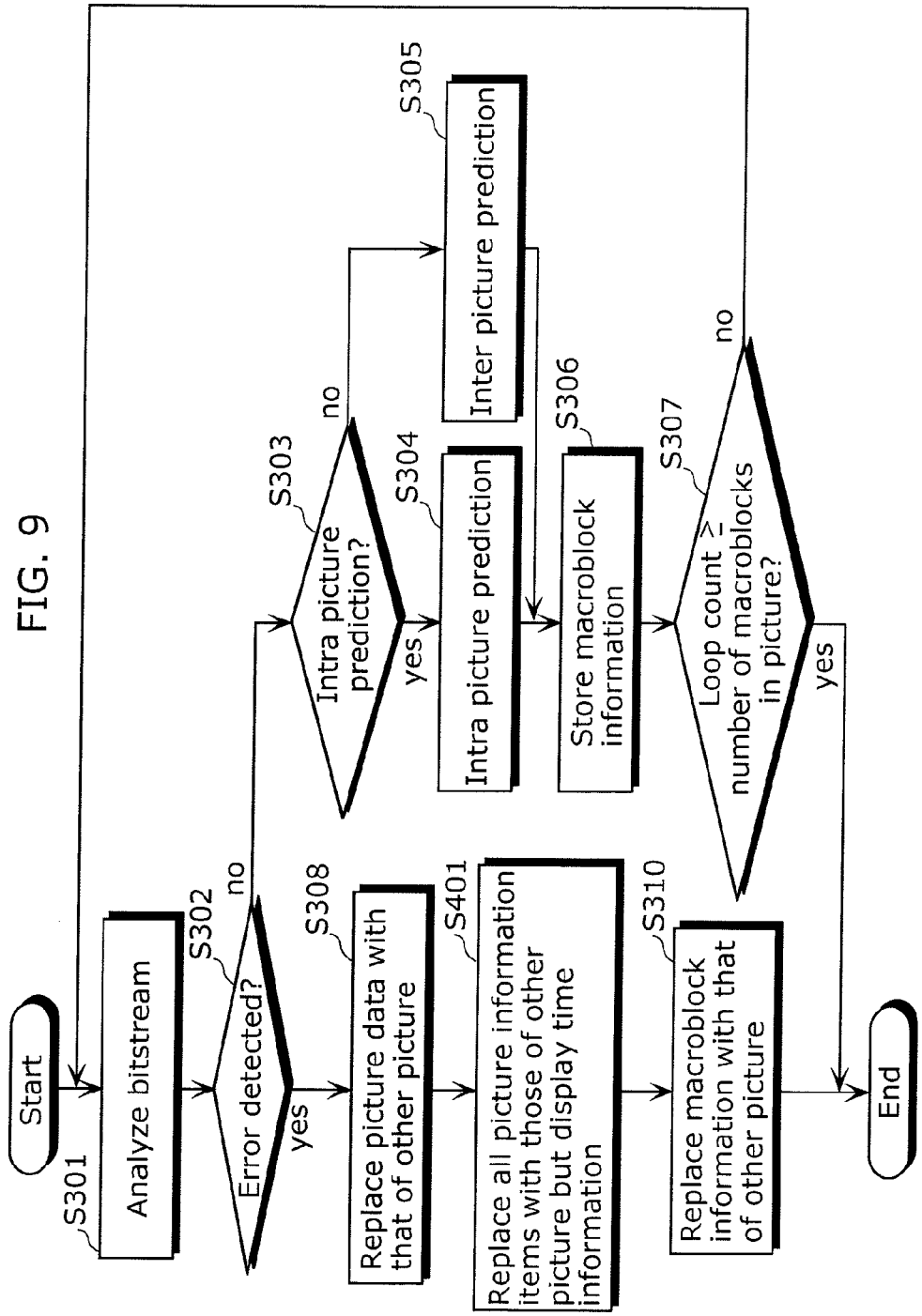
FIG. 9 is a flowchart showing an example of a decoding operation of the moving picture decoding apparatus according to the second embodiment.

An operation of the moving picture decoding apparatus according to the second embodiment is described using a flowchart shown in FIG. 9. FIG. 9 is a flowchart showing an example of a decoding operation of the moving picture decoding apparatus according to the second embodiment. Steps where the processes have been already described with reference to FIG. 8 are denoted by the same symbols, and thus a detailed description thereof is omitted.

The macroblock information replacing unit 113 first replaces display time information in picture management information of a previously decoded picture with that of a current picture to be decoded, and then replaces picture management information of the current picture to be decoded with that of the previously decoded picture. In other words, all items but display time information in picture management information of a current picture to be decoded is replaced with those of a previously decoded picture (S401).

This operation allows properly handling display time in a calculation in direct mode in order to achieve scaling with higher accuracy, thereby enhancing picture quality. It also allows using display time information with higher accuracy, thereby enabling a steady and continuous decoding operation.

Although only display time information among the items in picture management information is overwritten in the description above, other items such as a frame number may be also replaced.

Although display time information is replaced with that of a current picture to be decoded in the description above, display time information may be replaced with display time information calculated from that of a forward picture by externally inserting display time information of a current picture to be decoded and into the forward picture.

Although picture data and macroblock information of the last decoded picture are used as substitutes for replacement in the present embodiment, it is also possible to use as substitutes those of a picture to be displayed last or a picture closest to a current picture to be decoded in display order.

Picture data and macroblock information to be substitutes may be taken from a picture or different pictures. It is also possible to use some items of macroblock information of other pictures as substitutes and calculate some items.

Although concealment of picture data and macroblock information is performed on a picture-by-picture basis, it may be performed on a slice-by-slice or a macroblock-by-macroblock basis. Furthermore, for macroblocks in a picture, concealment may be performed for macroblocks from the first macroblock to a macroblock including an error, or for the macroblock including the error to the end macroblock.

Third Embodiment

Since a configuration of a moving picture decoding apparatus according to the third embodiment is the same as shown in FIG. 6 which is used for describing the first embodiment, a description thereof is omitted.

The third embodiment differs from the first and second embodiments in the operation of the macroblock information replacing unit 113. In the third embodiment, the macroblock information replacing unit 113 receives a judgment result from the error judging unit 104. When the result shows that an error has been detected, as in the case of the second embodiment, the macroblock information replacing unit 113 overwrites display time information in picture management information of a picture including the error with that of a previously decoded picture, and then outputs the picture management information to the information switching unit 112. Unlike in the first or the second embodiment, for all macroblocks in the picture including an error, the macroblock information replacing unit 113 modifies block type information so that it indicates that the macroblocks are predicted using intra picture prediction, and then outputs the picture. It is also possible that the macroblock information replacing unit 113 reads all macroblock information of the last decoded picture from the picture memory 103, substitutes it for all macroblock information of a current picture to be decoded and including an error, and then modifies all block type information included in all the macroblock information of the picture to output so that it indicates that the macroblocks are predicted using intra picture prediction. The macroblock information replacing unit 113 is an example of "the macroblock information replacing unit configured to replace, when the judging unit has judged that there is an error, the block type information included in the macroblock information of the current picture to be decoded with information that indicates intra picture prediction".

Figure 10:
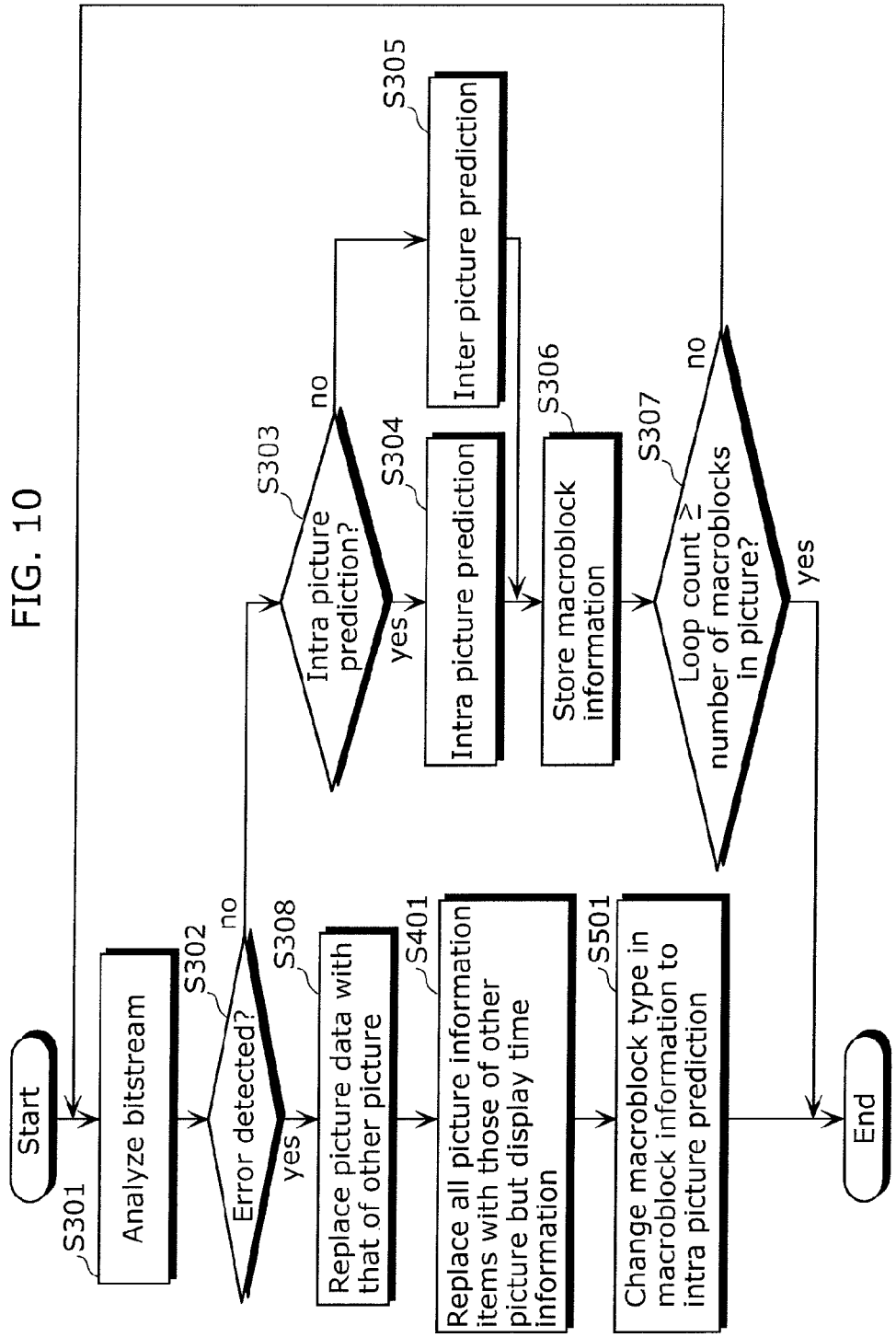
FIG. 10 is a flowchart showing an example of a decoding operation of the moving picture decoding apparatus according to the third embodiment.

An operation of the moving picture decoding apparatus according to the third embodiment is described using a flowchart shown in FIG. 10. Steps where the processes have been already described with reference to FIGS. 8 and 9 are denoted by the same symbols, and thus a detailed description thereof is omitted. FIG. 10 is a flowchart showing an example of a decoding operation of the moving picture decoding apparatus according to the third embodiment.

The macroblock information replacing unit 113 modifies block type information in macroblock information of a current macroblock to be decoded so that it indicates that the macroblock is predicted using intra picture prediction, and then outputs the picture to the information switching unit 112 (S501). Other items in the macroblock information do not need modifying.

This operation allows, when this picture is used as an anchor picture in a calculation in direct mode, handling the anchor macroblock as the one predicted using intra picture prediction and having no motion vector. Accordingly, as described above, picture data obtained by performing motion compensation represents an average of two previously decoded reference pictures, so that picture quality is increased especially for moving pictures with less motion.

Although only block type information in macroblock information of a current macroblock to be decoded is modified in the description above, other items in the macroblock information such as display time information may be also modified when the macroblock information replacing unit 113 outputs, to the information switching unit 112, macroblock information of a previously decoded picture read from the picture memory.

Although block type information in the macroblock information is modified so that the macroblock information indicates that the macroblock is predicted using intra picture prediction, it is also possible to modify motion vector information and the block type information so that it indicates the macroblock is predicted using inter picture prediction with a motion vector having a value of zero when the macroblock information replacing unit 113 outputs, to the information switching unit 112, macroblock information of a previously decoded picture read from the picture memory. The macroblock information replacing unit 113 is an example of "the macroblock information replacing unit configured to change, when the judging unit has judged that there is an error, a motion vector indicated by the motion vector information included in the macroblock information of the current picture to be decoded to zero".

Although picture data and macroblock information of the last decoded picture are used as substitutes for replacement in the third embodiment, it is also possible to use, as substitutes, those of a picture to be displayed last or a picture closest to a current picture to be decoded in display order.

Picture data and macroblock information to be substitutes may be taken from a picture or different pictures.

It is also possible to use some items of macroblock information of other pictures as substitutes and calculate some items.

Although concealment of picture data and macroblock information is performed on a picture-by-picture basis, it is also possible to be performed on a slice-by-slice or a macroblock-by-macroblock basis. Furthermore, for macroblocks in a picture, concealment may be performed for macroblocks from the first macroblock to a macroblock including an error, or for the macroblock including the error to the end macroblock.

Fourth Embodiment

Figure 11:
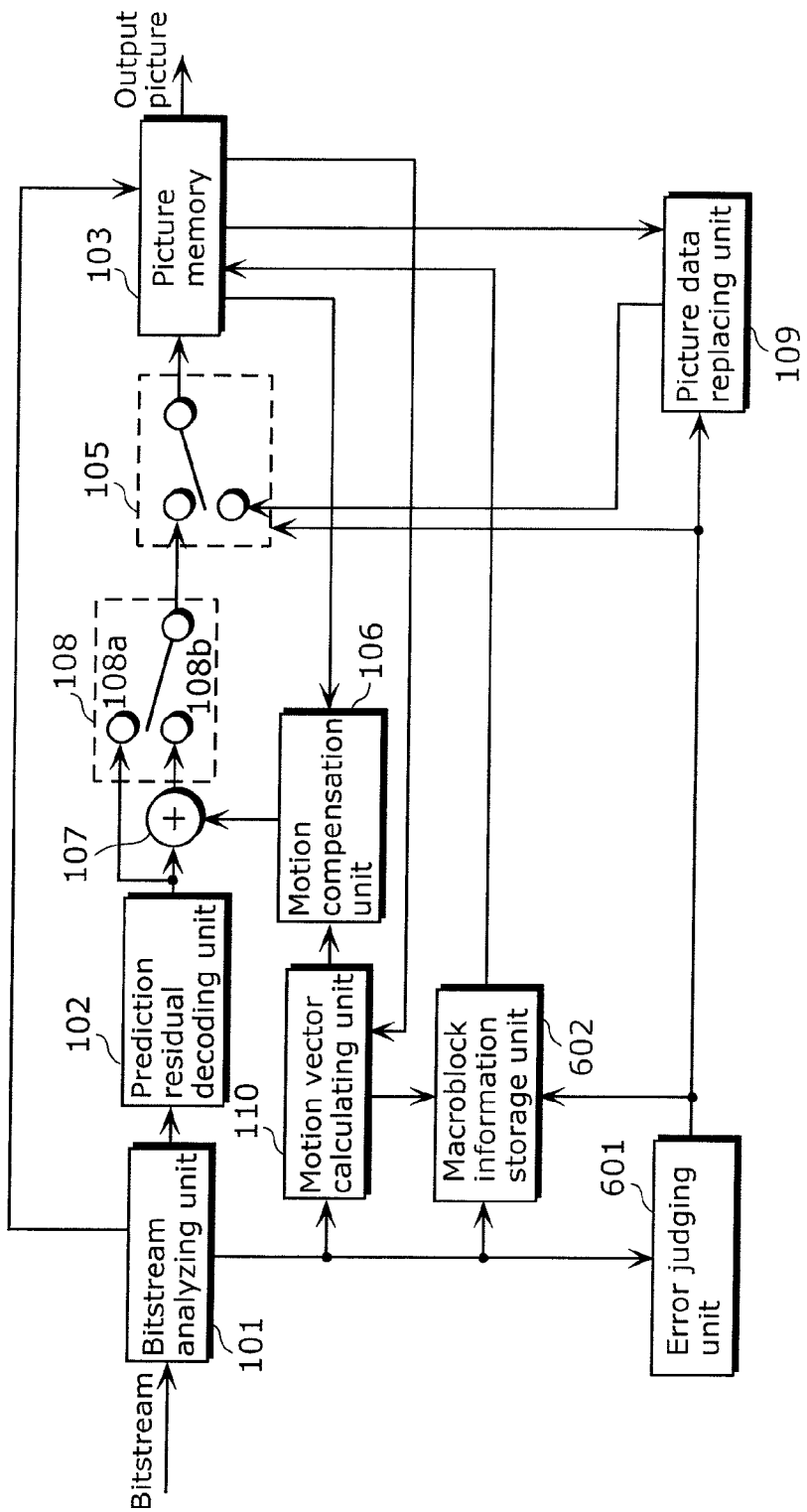
FIG. 11 is a block diagram showing a configuration of the moving picture decoding apparatus according to the fourth embodiment.

A configuration of a moving picture decoding apparatus according to the fourth embodiment is described using FIG. 11. FIG. 11 is a block diagram showing a configuration of the moving picture decoding apparatus according to the fourth embodiment.

The fourth embodiments differs from the embodiments described above in that an error judging result of an error judging unit 601 is inputted as error information into a macroblock information storage unit 602.

As in the embodiments described above, the macroblock information storage unit 602 according to the fourth embodiment stores, for all macroblocks of a current picture to be decoded, at least motion vector information and block type information included in macroblock information of the current picture to be decoded. In addition, the macroblock information storage unit 602 according to the fourth embodiment stores error information. The macroblock information storage unit 602 stores as error information, when an error judging result shows that the error judging unit 601 has detected no error, a flag that indicates that stored macroblock information is correct. The flag is stored in the macroblock information as an item thereof. The macroblock information storage unit 602 stores, when an error judging result shows that the error judging unit 601 has detected an error, a flag that indicates that stored macroblock information includes an error. The flag is stored in the macroblock information as an item thereof for all macroblocks included in the picture. It is also possible that the information storage unit 602 stores a flag in macroblock information as an item thereof only when an error judging result shows that the error judging unit 601 has detected an error. The macroblock information storage unit 602 is an example of "a macroblock information storage unit configured to store, when the judging unit has judged that a error is present in the current picture to be decoded, (i) information that indicates the error is present in the current picture to be decoded and (ii) the macroblock information of the current picture in which the error is present, in association with each other".

When the motion vector calculating unit 110 reads error information included in macroblock information situated in a corresponding position in an anchor picture from the picture memory 103 and it turns out to be that the error information indicates no error in decoding the macroblock, the motion vector calculating unit 110 calculates a motion vector in direct mode using the macroblock as a correct one.

When error information included in macroblock information of a macroblock indicates an error in decoding a picture that includes the macroblock, the motion vector calculating unit 110 operates, without using a motion vector value or block type information read from the picture memory 103, assuming that the block type information indicates that the macroblock is predicted using intra picture prediction. The motion vector calculating unit 110 may calculate, instead of assuming that the block type information indicates that the macroblock is predicted using intra picture prediction, a motion vector in spatial direct mode when error information indicates that there is an error in a picture including an anchor macroblock. The motion vector calculating unit 110 is an example of "the decoding unit configured to change, when referring to macroblock information of a previously decoded picture to decode the current picture to be decoded and the macroblock information being referred to has an association with the information indicating that the current picture to be decoded includes the error, a decoding operation indicated by the macroblock information to a different decoding operation" and "the decoding unit configured to judge, when the macroblock information being referred to has an association with the information indicating that the current picture to be decoded includes the error, that the macroblock information indicates intra picture prediction regardless of a block type indicated by the macroblock information that the decoding unit has referred to and decode the current picture to be decoded".

Figure 12:
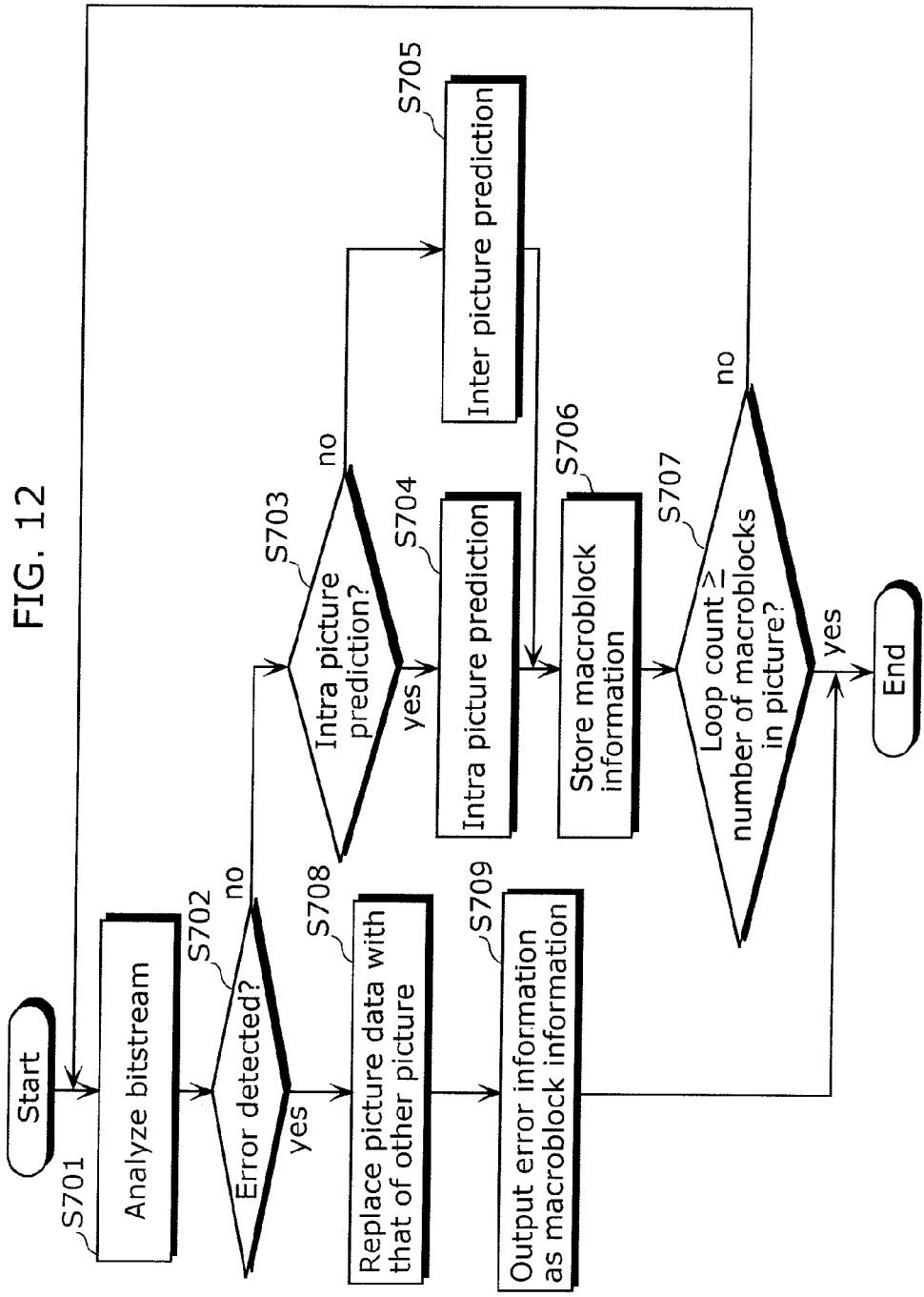
FIG. 12 is a flowchart showing an operation of the moving picture decoding apparatus in which a flag indicating an error in macroblock information is stored in the macroblock information as an item thereof when a judgment result shows that an error has been detected.
Figure 13:
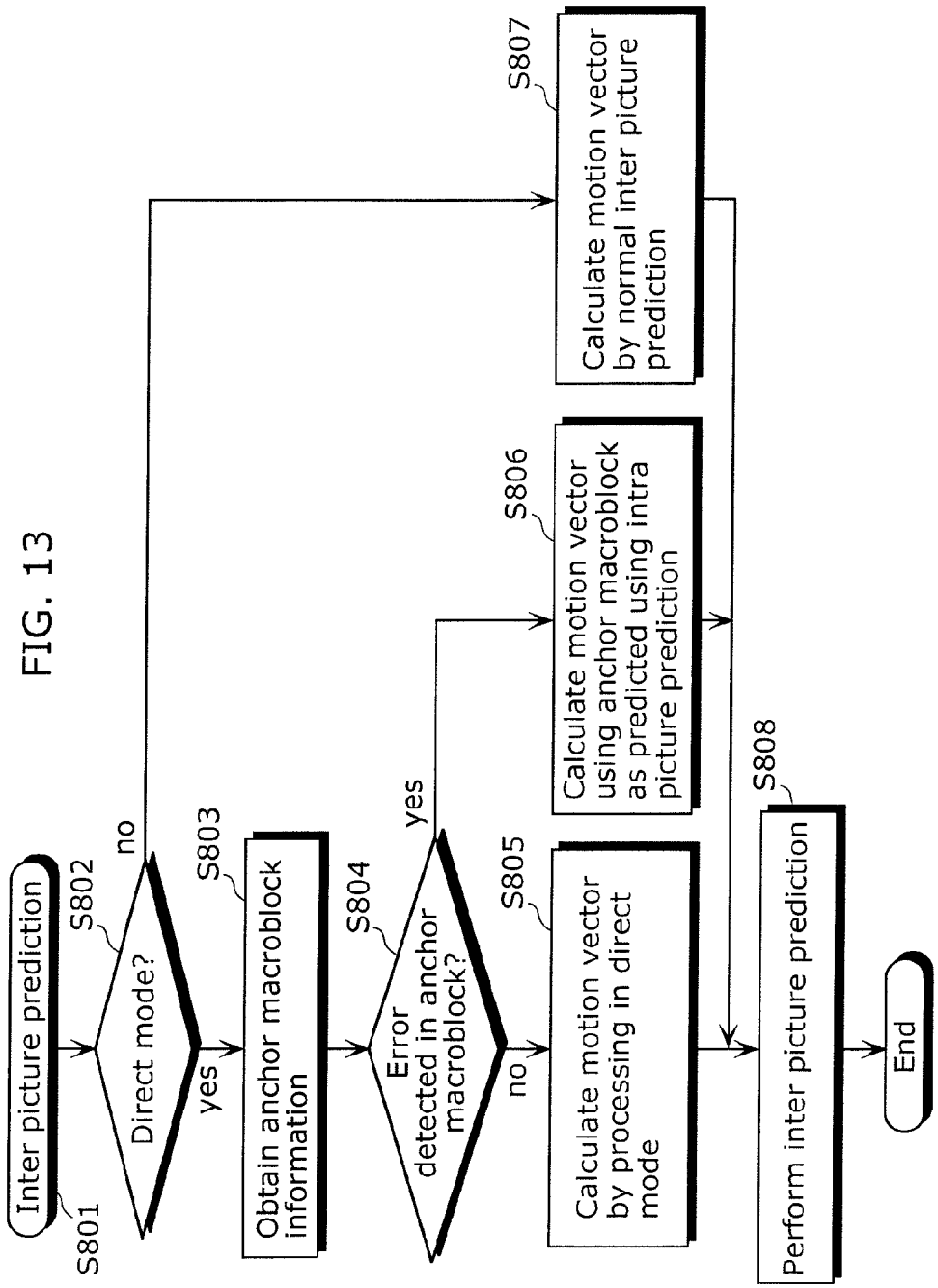
FIG. 13 is a flowchart showing an operation of the moving picture decoding apparatus that performs inter picture prediction when a flag that indicates presence or absence of an error is stored in macroblock information as an item thereof.

An operation according to the fourth embodiment is described using flowcharts shown in FIGS. 12 and 13. FIG. 12 is a flowchart showing an operation of the moving picture decoding apparatus. In this operation, a flag indicating an error in macroblock information is stored in the macroblock information as an item thereof when a judgment result shows that an error has been detected. FIG. 13 is a flowchart showing an operation of the moving picture decoding apparatus that performs inter picture prediction when a flag that indicates presence or absence of an error is stored in macroblock information as an item thereof.

First, the bitstream analysis unit 101 obtains block type information and motion vector information from a received bitstream (S701).

The error judging unit 601 judges whether or not that a bitstream analysis unit has detected an error (S702).

When the error judging unit 601 in step S702 judges that no error has been detected, the macroblock type switching unit 108 switches picture prediction methods for each macroblock according to its block type information (S703).

When a macroblock is of a type to be predicted using intra picture prediction, the prediction residual decoding unit 102 or an intra picture prediction unit, which is not shown in figures, generates decoded picture data and stores the data in the picture memory 103 (S704).

The case where a macroblock is of a type to be predicted using inter picture prediction is described below, and a description thereof is omitted here (S705).

Next, the macroblock information storage unit 602 stores, in the picture memory 103, macroblock information that includes the block type information and the motion vector information for the decoding process (S706).

The steps above are repeated for all the macroblocks in a current picture to be decoded (S707).

When the error judging unit 601 in step S702 judges that an error has been detected, the picture data replacing unit 109 replaces whole picture data of a picture being decoded with picture data of a previously decoded picture (S708).

Furthermore, the error judging unit 601 causes the macroblock information storage unit 602 to output at least a flag that indicates an error as macroblock information for all macroblocks of the current picture to be decoded (S709).

The moving picture decoding apparatus described in the fourth embodiment completes a decoding operation for a picture to be decoded. An operation of the motion vector calculating unit 110 in step S705 where block type information indicates that a macroblock is predicted using inter picture prediction is described in detail below with reference to the flowchart shown in FIG. 13.

First, it is judged whether or not block type information indicates that the macroblock is predicted in direct mode (S802).

When block type information does not indicate that the macroblock is predicted in direct mode, a motion vector is calculated using usual inter picture prediction, not in direct mode (S807).

When block type information indicates that the macroblock is predicted in direct mode, picture management information of an anchor picture and macroblock information of an anchor macroblock are obtained from the picture memory 103 (S803).

It is then judged whether error information in the macroblock information of the anchor macroblock indicates that an error has been detected (S804).

When the error information does not indicate that an error has been detected, the obtained macroblock information is considered correct and used for calculating a motion vector in direct mode (S805).

When the error information indicates that an error has been detected, the obtained macroblock information is considered incorrect, and a motion vector is calculated in direct mode with an assumption that the block type information of the anchor macroblock indicates that the anchor macroblock is predicted using intra picture prediction (S806).

The calculated motion vector is used for motion compensation in a process of inter picture prediction from a reference picture obtained from the picture memory 103 (S807).

Decoding in direct mode as described above avoids using macroblock information including an error when there is an error in a picture including an anchor macroblock, thereby enabling steady and continuous decoding even for a stream including an error.

Although a flag that indicates that an error has been detected is stored in macroblock information of all macroblocks of a picture for which the error is detected, such a flag may be stored only in macroblock information of a macroblock including an error or of all macroblocks after the macroblock including an error in addition in it. It is also possible to set such a flag in a corresponding slice.

Furthermore, such error information may be written not in macroblock information but in picture management information. Macroblock information described above may be substituted by information for another unit (picture, slice, or the like) because setting only one flag is rational than setting flags in all macroblocks to indicate an error. In this case, error flags are set in such information. In this case, the moving picture decoding apparatus operates in the same manner when an error set in a picture is on as when error flags set in all macroblocks in the picture are on.

Although block type information of an anchor macroblock that includes an error indicates that the anchor macroblock is predicted using intra picture prediction according to the fourth embodiment, the block type information may indicate that the anchor macroblock is predicted using inter picture prediction with a motion vector having a magnitude of zero. Furthermore, the present invention is not limited to this. Decoding may be performed using a method other than intra picture prediction or inter picture prediction with a motion vector having a magnitude of zero because what is essential is executing error concealment by any method when an error flag is set in macroblock information.

Fifth Embodiment

Since a configuration of a moving picture decoding apparatus according to the fifth embodiment is the same as shown in FIG. 6 which is used for describing the first embodiment, a description thereof is omitted.

The fifth embodiment differs from the first embodiment in the operation of the error judging unit 104. When an error is detected in macroblock information, the error judging unit 104 informs the decoded picture data switching unit 105, the picture data replacing unit 109, the macroblock information replacing unit 113, and the information switching unit 112 about the error as in the case of the first embodiment. However, when an error is not detected in macroblock information, the error judging unit 104 informs only the decoded picture data switching unit 105 and the picture data replacing unit 109 about the error. This allows using the macroblock information as it is while replacing only picture data with that of another picture.

The bitstream analysis unit 101 and the error judging unit 104 are an example of "the judging unit further configured to judge whether or not the error is present in information included in the macroblock information". The macroblock information replacing 113 is an example of "the macroblock information replacing unit configured to replace the macroblock information of a current picture to be decoded with macroblock information stored in the storage unit, only when the judging unit has judged that the error is present in the information included in the macroblock information".

Figure 14:
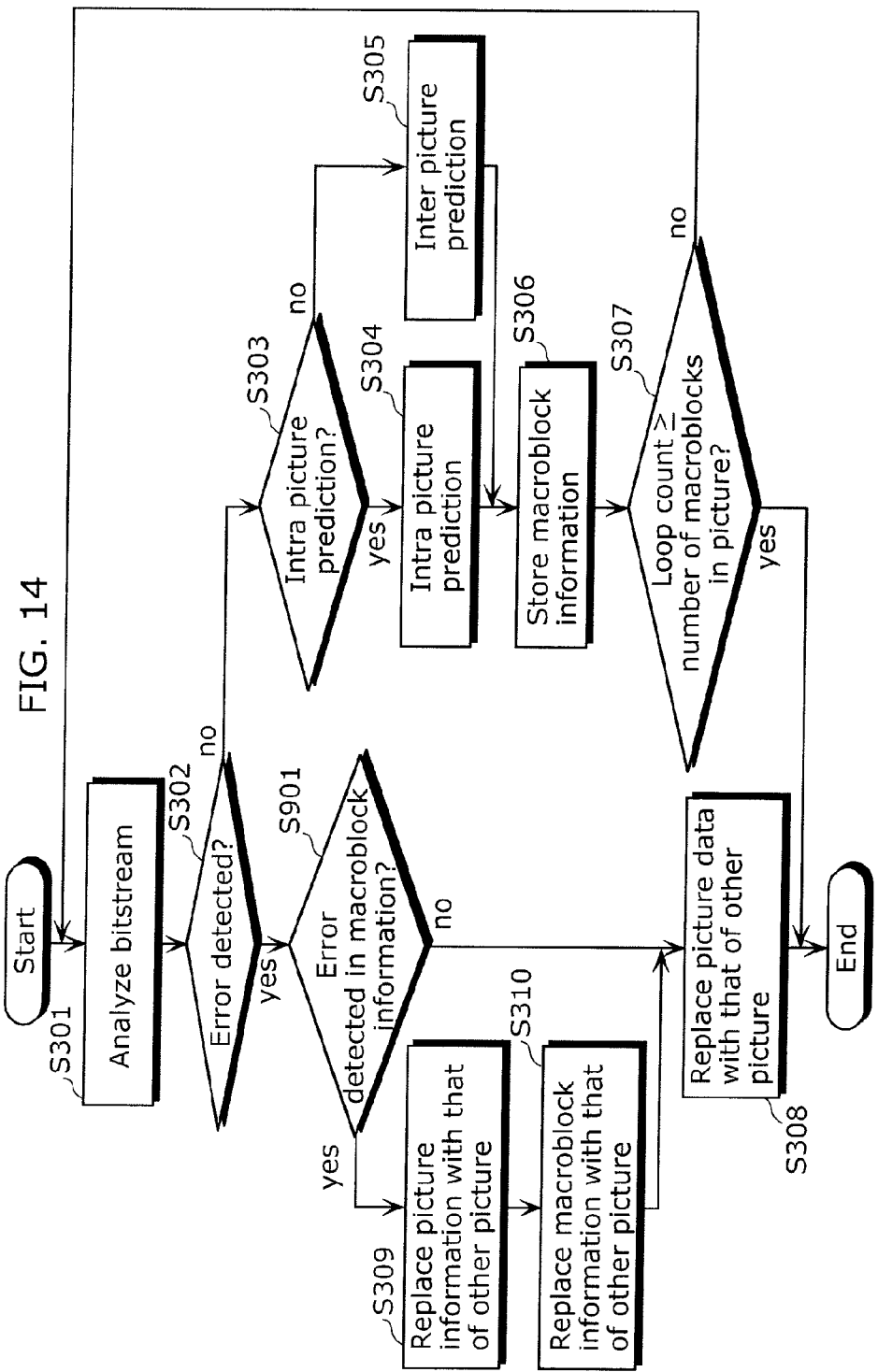
FIG. 14 is a flowchart showing an example of a decoding operation of the moving picture decoding apparatus according to the fifth embodiment.

An operation of the moving picture decoding apparatus according to the fifth embodiment is described using a flowchart shown in FIG. 14. FIG. 14 is a flowchart showing an example of a decoding operation of the moving picture decoding apparatus according to the fifth embodiment. Steps where the process has been already described with reference to FIG. 8 are denoted by the same symbols, and thus a description thereof is omitted. The case where an error is detected in macroblock information in step S901 has been already described for the first embodiment, and thus a description of thereof is omitted.

When the error judging unit 104 judges that an error has been detected after normal decoding of macroblock information (S901), whole picture data of a current picture to be decoded is replaced with picture data of a previously decoded picture by the picture data replacing unit 109 (S308). In this case, macroblock information is used without being changed.

This operation minimizes necessary substitutional information according to where an error has been detected, thereby enhancing processing efficiency.

According to the second to fifth embodiments above, display time information in macroblock information is overwritten when macroblock information of a previously decoded picture read from the picture memory is outputted to the information switching unit 112. The present invention, however, is not limited to this. For example, it is also possible to overwrite motion vector information included in macroblock information of a previously decoded picture read from the picture memory with motion vector information obtained by scaling on the basis of the approximately calculated display time of the current picture to be decoded, instead of overwriting display time information of a previously decode picture with a display time of a current picture to be decoded approximately calculated from a frame rate or the like.

The fifth embodiment shows an advantageous effect that the moving picture decoding apparatus according to the present invention adds, to a picture including an error, information that provides the picture including an error with a motion vector referred to in temporal direct mode even when error concealment is performed.

Sixth Embodiment

Figure 15:
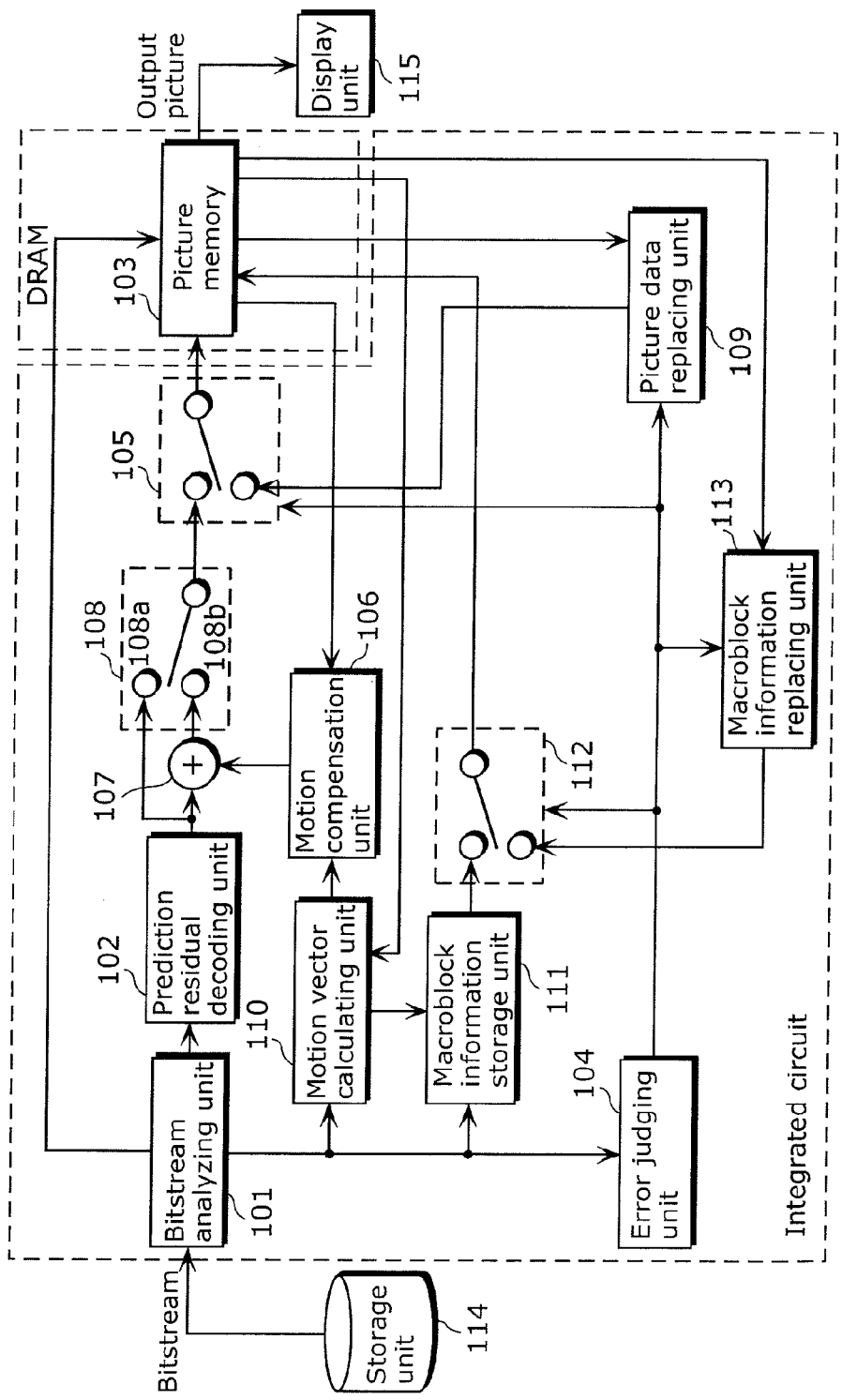
FIG. 15 is a block diagram showing an exemplary configuration of the moving picture decoding apparatus according to the present invention.

A configuration of a moving picture decoding apparatus according to the sixth embodiment is described using FIG. 15. FIG. 15 is a block diagram showing an exemplary hardware configuration of the moving picture decoding apparatus.

The moving picture decoding apparatus according to the sixth embodiment has a configuration where all the units described in the first embodiment but the picture memory 103 are built in an LSI that is an integrated circuit and the picture memory 103 is a dynamic random access memory (DRAM). This moving picture decoding apparatus receives a bitstream from the storage unit 114 and displays a picture on a display unit 115.

An operation according to the sixth embodiment is the same as the operation according the first embodiment.

Some or all of the LSI, the DRAM, the storage unit, and the display unit may be integrated into a single chip. They may be also separated and implemented on a plurality of chips.

Although an integrated circuit is here referred to as an LSI, the integrated circuit may be referred to as an IC, a system LSI, a super LSI or an ultra LSI, depending on the degree of integration. The method for forming integrated circuitry is not limited to use of such LSIs. Dedicated circuitry or a general-purpose processor may be used instead of such LSIs. Also applicable are a field programmable gate array (FPGA), which allows post-manufacture programming, and a reconfigurable processor LSI, which allows post-manufacture reconfiguration of connection and setting of circuit cells therein.

Furthermore, when an advance in or derivation from semiconductor technology brings about an integrated circuitry technology whereby an LSI is replaced, function blocks may be obviously integrated using such a new technology. The application of biotechnology or the like is possible.

Viewers will view a moving picture free from distortion using the display unit 115 connected to the moving picture decoding apparatus even when the moving picture includes an error.

The display unit 115 may be a CRT, a liquid-crystal television, or a plasma display panel.

The storage unit 114 may be a hard disk drive, a flash memory, or a disk drive for DVDs or the like. The picture memory 103 is not limited to a DRAM. It may be a static RAM, a flash memory, or a hard disk drive.

Seventh Embodiment

Furthermore, a program recorded on a storage medium such as a flexible disk for implementing any of the methods for picture signal processing described in the embodiments above enables easy execution of the processes described in these embodiments on an independent computer system.

Figure 16A:
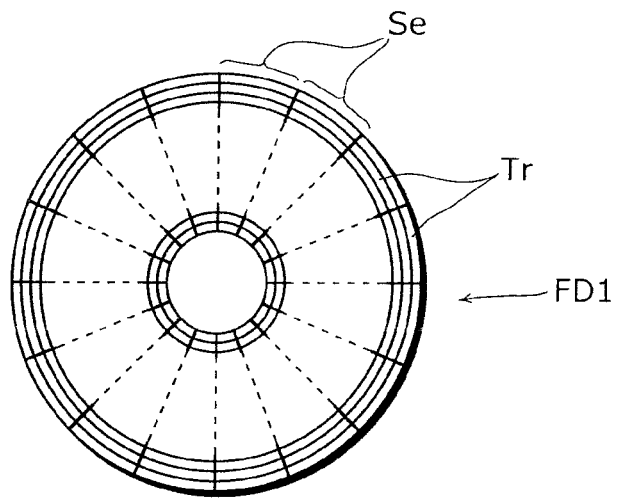
FIGS. 16A, 16B, and 16C illustrate a case where any of the methods for processing picture signals described in the embodiments above is implemented on a computer system using a program recorded on a storage media such as a flexible disk.
Figure 16B:
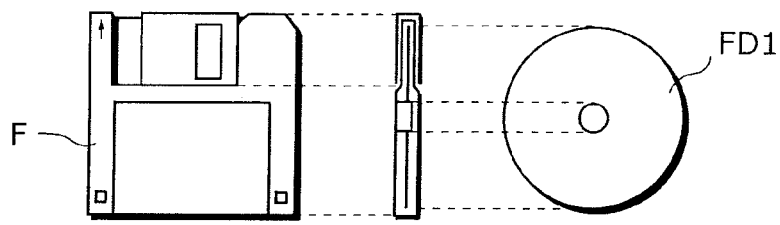
Figure 16C:
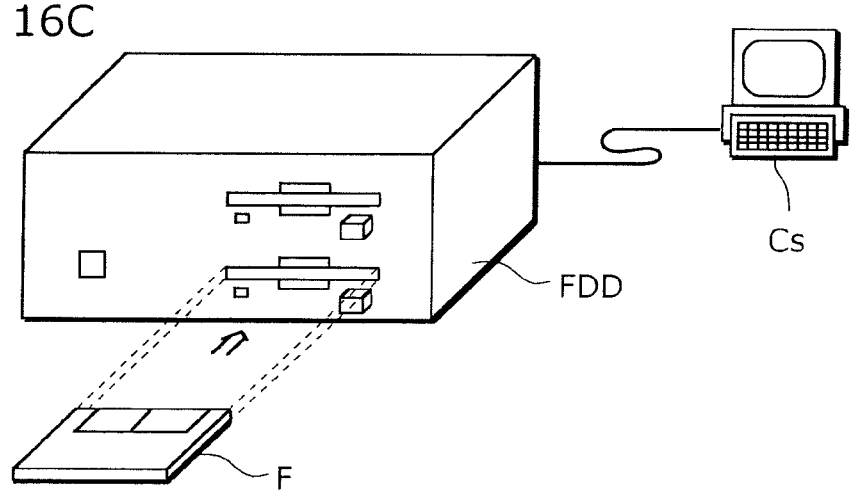

FIGS. 16A, 16B, and 16C illustrate a case where any of the methods for processing picture signals described in the embodiments above is implemented on a computer system using a program recorded on a storage media such as a flexible disk.

FIG. 16B shows a front view and a cross-sectional view of a flexible disk, and a flexible disk body. FIG. 16A shows an example of a physical format of the flexible disk body that is a storage medium body. The flexible disk body FD contained in a case F has a surface where a plurality of tracks Tr is formed concentrically from the outermost circumference toward the innermost circumference. Each track is radially divided into 16 sectors Se. In the flexible disk storing the program, the program is recorded in the sectors assigned on the flexible disk body FD.

FIG. 16C shows a configuration for recording and reproducing the program on the flexible disk body FD. In order to record the program for implementing the picture signal processing method on the flexible disk body FD, the program is written from a computer system Cs on the flexible disk body FD via a flexible disk drive FDD. In order to install the program in the flexible disk to be used for the picture signal processing method in the computer system, the program is read using the flexible disk drive FDD and transferred to the computer system.

Although a flexible disk is employed as a storage medium in the above description, an optical disk may be employed instead as a data storage medium in the same manner as described for the flexible disk. Furthermore, the storage medium is not limited to the flexible disk. Any medium, such as an integrated circuit (IC) card and a read-only-memory (ROM) cassette, may be employed instead also in the same manner as described for the flexible disk as long as the program can be stored thereon.

INDUSTRIAL APPLICABILITY

As described above, a moving picture decoding apparatus according to the present invention is applicable to equipment for decoding or displaying pictures that form a moving picture, such as a mobile phone, a DVD drive, a set-top box, a digital television, an automobile, a car navigation system, and a security system.

The invention claimed is:

1. A moving picture decoding apparatus which predicts and generates motion vector information for a current macroblock to be decoded having no motion vector information, with reference to macroblock information of another macroblock, said moving picture decoding apparatus comprising:
a storage unit configured to store the macroblock information of the other macroblock; and
a decoding unit configured to change a decoding operation in which the macroblock information of the other macroblock is referred to (i) to a decoding operation in which the macroblock information of the other macroblock is not referred to or (ii) to a decoding operation in which modified macroblock information obtained by modifying the macroblock information of the other macroblock is referred to, when the macroblock information of the other macroblock is associated with information indicating presence of an error, the other macroblock being (i) included in a picture previously decoded and (ii) situated in a position corresponding to a position of the current macroblock to be decoded.

2. The moving picture decoding apparatus according to claim 1, comprising:
a judging unit configured to judge whether or not an error is present in the other macroblock when the other macroblock is decoded;
wherein said storage unit is configured to store information indicating the presence of the error in association with the macroblock information of the other macroblock, when said judging unit judges that the error is present.

3. The moving picture decoding apparatus according to claim 2, wherein said judging unit is configured to judge, as erroneous, all macroblocks starting from the current macroblock up to a macroblock at an end of a slice to which these macroblocks belong when the error is present in the other macroblock.

4. The moving picture decoding apparatus according to claim 2,
wherein said storage unit is configured to include information indicating presence or absence of the error in the macroblock information of the other macroblock, and store the macroblock information of the other macroblock.

5. The moving picture decoding apparatus according to claim 2, wherein said storage unit is configured to include information indicating presence or absence of the error in picture management information, and store the picture management information.

6. The moving picture decoding apparatus according to claim 2,
wherein said storage unit is configured to store the information indicating presence or absence of the error on a per set-of-macroblocks basis, and
wherein said decoding unit is configured to change the decoding operation as if the error was present in all macroblock information included in the set of macroblocks.

7. The moving picture decoding apparatus according to claim 6,
wherein the set of macroblocks composes a slice.

8. The moving picture decoding apparatus according to claim 6,
wherein the set of macroblocks composes a picture.

9. The moving picture decoding apparatus according to claim 1,
wherein said decoding unit is configured to refer to macroblock information of a picture that has been normally decoded.

10. The moving picture decoding apparatus according to claim 1,
wherein said decoding unit is configured to replace the macroblock information of the other macroblock with macroblock information indicating intra picture prediction.

11. The moving picture decoding apparatus according to claim 1,
wherein said decoding unit is configured to replace a value of motion vector information included in the macroblock information of the other macroblock with zero.

12. The moving picture decoding apparatus according to claim 1,
wherein said decoding unit is configured to change a decoding mode to a spatial direct mode.

13. A method of decoding a moving picture in which motion vector information for a current macroblock to be decoded having no motion vector information is predicted and generated with reference to macroblock information of another macroblock, said method comprising changing a decoding operation in which the macroblock information of the other macroblock is referred to (i) to a decoding operation in which the macroblock information of the other macroblock is not referred to or (ii) to a decoding operation in which modified macroblock information obtained by modifying the macroblock information of the other macroblock is referred to, when the macroblock information of the other macroblock is associated with information indicating presence of an error, the other macroblock being (i) included in a picture previously decoded and (ii) situated in a position corresponding to a position of the current macroblock to be decoded.

14. A non-transitory computer-readable recording medium for use in a computer, said recording medium having a computer program recorded thereon to predict and generate, with reference to macroblock information of another macroblock, motion vector information for a current macroblock to be decoded having no motion vector information, and the computer program causing the computer to execute
changing a decoding operation in which the macroblock information of the other macroblock is referred to (i) to a decoding operation in which the macroblock information of the other macroblock is not referred to or (ii) to a decoding operation in which modified macroblock information obtained by modifying the macroblock information of the other macroblock is referred to, when the macroblock information of the other macroblock is associated with information indicating presence of an error, the other macroblock being (i) included in a picture previously decoded and (ii) situated in a position corresponding to a position of the current macroblock to be decoded.

15. An integrated circuit for use in a moving picture decoding apparatus which predicts and generates motion vector information for a current macroblock to be decoded having no motion vector information, with reference to macroblock information of another macroblock, said integrated circuit comprising:
a storage unit configured to store the macroblock information of the other macroblock; and
a decoding unit configured to change a decoding operation in which the macroblock information of the other macroblock is referred to (i) to a decoding operation in which the macroblock information of the other macroblock is not referred to or (ii) to a decoding operation in which modified macroblock information obtained by modifying the macroblock information of the other macroblock is referred to, when the macroblock information of the other macroblock is associated with information indicating presence of an error, the other macroblock being (i) included in a picture previously decoded and (ii) situated in a position corresponding to a position of the current macroblock to be decoded.

16. A moving picture decoding apparatus which predicts and generates motion vector information for a current macroblock to be decoded having no motion vector information, with reference to macroblock information of another macroblock, said moving picture decoding apparatus comprising:
a storage unit in which a coded motion picture stream is stored;
a decoding unit configured to decode the coded motion picture stream read from the storage unit;
a picture memory in which a decoded picture resulting from the decoding by said decoding unit is stored; and
a display unit configured to display the decoded picture read from said picture memory,
wherein said decoding unit is configured to change a decoding operation in which the macroblock information of the other macroblock is referred to (i) to a decoding operation in which the macroblock information of the other macroblock is not referred to or (ii) to a decoding operation in which modified macroblock information obtained by modifying the macroblock information of the other macroblock is referred to, when the macroblock information of the other macroblock is associated with information indicating presence of an error, the other macroblock being (i) included in a picture previously decoded and (ii) situated in a position corresponding to a position of the current macroblock to be decoded.

\* \* \* \* \*